(12) United States Patent
Liang et al.

(10) Patent No.: US 10,824,798 B2
(45) Date of Patent: Nov. 3, 2020

(54) DATA COLLECTION FOR A NEW CONVERSATIONAL DIALOGUE SYSTEM

(71) Applicant: Semantic Machines, Inc., Newton, MA (US)

(72) Inventors: Percy Shuo Liang, Palo Alto, CA (US); Daniel Klein, Orinda, CA (US); Laurence Steven Gillick, Newton, MA (US); Jordan Rian Cohen, Kure Beach, NC (US); Linda Kathleen Arsenault, Chelmsford, MA (US); Joshua James Clausman, Somerville, MA (US); Adam David Pauls, Berkeley, CA (US); David Leo Wright Hall, Berkeley, CA (US)

(73) Assignee: Semantic Machines, Inc., Newton, MA (US)

( * ) Notice: Subject to any disclaimer, the term of this patent is extended or adjusted under 35 U.S.C. 154(b) by 0 days.

(21) Appl. No.: 15/804,093

(22) Filed: Nov. 6, 2017

(65) Prior Publication Data
US 2018/0203833 A1    Jul. 19, 2018

Related U.S. Application Data

(60) Provisional application No. 62/418,035, filed on Nov. 4, 2016.

(51) Int. Cl.
*G06F 40/35* (2020.01)
*G10L 15/22* (2006.01)
(Continued)

(52) U.S. Cl.
CPC .......... *G06F 40/169* (2020.01); *G06F 3/0482* (2013.01); *G06F 7/08* (2013.01);
(Continued)

(58) Field of Classification Search
CPC .... G06F 17/27; G06F 17/271; G06F 17/2715; G06F 17/2785; G06F 40/20; G06F 40/30;
(Continued)

(56) References Cited

U.S. PATENT DOCUMENTS 5,995,918 A    11/1999   Kendall et al.
6,173,261 B1    1/2001   Arai et al.
(Continued)

FOREIGN PATENT DOCUMENTS

EP    1352317 A2    10/2003
EP    3374880 A1    9/2018
(Continued)

OTHER PUBLICATIONS

Wang et al., "Building a Semantic Parser", Proceedings of the 53rd Annual Meeting of the Association for Computational Linguistics and the 7th International Joint Conference on Natural Language Processing, Jul. 2015, vol. 1, pp. 1332 to 1342. (Year: 2015).*
(Continued)

*Primary Examiner* — Martin Lerner
(74) *Attorney, Agent, or Firm* — Alleman Hall Creasman & Tuttle LLP

(57) ABSTRACT

A data collection system is based on a general set of dialogue acts which are derived from a database schema. Crowd workers perform two types of tasks: (i) identification of sensical dialogue paths and (ii) performing context-dependent paraphrasing of these dialogue paths into real dialogues. The end output of the system is a set of training examples of real dialogues which have been annotated with their logical forms. This data can be used to train all three components of the dialogue system: (i) the semantic parser for understanding context-dependent utterances, (ii) the dialogue policy for generating new dialogue acts given the
(Continued)

current state, and (iii) the generation system for both deciding what to say and how to render it in natural language.

20 Claims, 24 Drawing Sheets

(51) Int. Cl.
    *G06F 40/169*     (2020.01)
    *G06N 20/00*     (2019.01)
    *G10L 15/06*     (2013.01)
    *G06F 40/20*     (2020.01)
    *G06F 40/30*     (2020.01)
    *G06F 40/205*     (2020.01)
    *G06F 3/0482*     (2013.01)
    *G06F 7/08*     (2006.01)

(52) U.S. Cl.
    CPC ............ *G06F 40/20* (2020.01); *G06F 40/205* (2020.01); *G06F 40/30* (2020.01); *G06N 20/00* (2019.01); *G10L 15/063* (2013.01); *G10L 15/22* (2013.01); *G10L 2015/0638* (2013.01)

(58) Field of Classification Search
    CPC ....... G06F 40/35; G10L 15/06; G10L 15/063; G10L 15/18; G10L 15/1815; G10L 15/1822; G10L 15/22
    USPC .................................... 704/9, 243, 257, 275
    See application file for complete search history.

(56) References Cited

U.S. PATENT DOCUMENTS

| | | | |
|---|---|---|---|
| 6,173,266 B1 * | 1/2001 | Marx | G10L 15/22 704/270 |
| 6,192,343 B1 | 2/2001 | Morgan et al. | |
| 6,292,771 B1 | 9/2001 | Haug et al. | |
| 6,430,551 B1 | 8/2002 | Thelen et al. | |
| 7,133,827 B1 | 11/2006 | Gillick et al. | |
| 7,698,136 B1 | 4/2010 | Nguyen et al. | |
| 7,725,308 B2 | 5/2010 | Russell | |
| 7,933,774 B1 | 4/2011 | Begeja et al. | |
| 8,660,849 B2 | 2/2014 | Gruber et al. | |
| 8,706,486 B1 | 4/2014 | Devarajan et al. | |
| 9,104,754 B2 | 8/2015 | Wedeniwski | |
| 9,275,641 B1 | 3/2016 | Gelfenbeyn et al. | |
| 9,280,610 B2 | 3/2016 | Gruber et al. | |
| 9,318,109 B2 | 4/2016 | Boies et al. | |
| 9,348,805 B1 * | 5/2016 | Uszkoreit | G06F 17/2705 |
| 9,390,087 B1 | 7/2016 | Roux et al. | |
| 9,495,331 B2 | 11/2016 | Govrin et al. | |
| 9,772,993 B2 | 9/2017 | Braga et al. | |
| 9,830,315 B1 * | 11/2017 | Xiao | G06F 17/2785 |
| 10,042,844 B2 * | 8/2018 | Anand | G06F 17/28 |
| 10,607,504 B1 | 3/2020 | Ramanarayanan et al. | |
| 2002/0032564 A1 | 3/2002 | Ehsani et al. | |
| 2002/0173955 A1 | 11/2002 | Reich | |
| 2003/0144055 A1 | 7/2003 | Guo et al. | |
| 2004/0083092 A1 | 4/2004 | Valles | |
| 2004/0193420 A1 | 9/2004 | Kennewick et al. | |
| 2004/0236575 A1 | 11/2004 | Goronzy et al. | |
| 2005/0080629 A1 | 4/2005 | Attwater et al. | |
| 2005/0105712 A1 | 5/2005 | Williams et al. | |
| 2005/0197828 A1 | 9/2005 | Mcconnell et al. | |
| 2005/0278180 A1 | 12/2005 | O'neill et al. | |
| 2006/0106595 A1 * | 5/2006 | Brockett | G06F 40/30 704/9 |
| 2006/0122837 A1 | 6/2006 | Kim et al. | |
| 2006/0123358 A1 | 6/2006 | Lee et al. | |
| 2006/0136227 A1 * | 6/2006 | Mizutani | G10L 15/22 704/277 |
| 2007/0174043 A1 | 7/2007 | Makela | |
| 2007/0185702 A1 | 8/2007 | Harney et al. | |
| 2008/0167876 A1 | 7/2008 | Bakis et al. | |
| 2008/0184164 A1 * | 7/2008 | Di Fabbrizio | G10L 15/22 715/809 |
| 2009/0327263 A1 | 12/2009 | Maghoul | |
| 2010/0217597 A1 * | 8/2010 | Begeja | G10L 15/18 704/251 |
| 2011/0015925 A1 | 1/2011 | Xu et al. | |
| 2011/0295591 A1 * | 12/2011 | Fang | G06F 40/289 704/9 |
| 2011/0301943 A1 | 12/2011 | Patch | |
| 2012/0081371 A1 * | 4/2012 | Ozkaragoz | G06F 17/289 345/467 |
| 2012/0265534 A1 | 10/2012 | Coorman et al. | |
| 2013/0080167 A1 | 3/2013 | Mozer | |
| 2013/0111348 A1 | 5/2013 | Gruber et al. | |
| 2013/0185074 A1 * | 7/2013 | Gruber | G10L 15/26 704/257 |
| 2013/0275138 A1 | 10/2013 | Gruber et al. | |
| 2013/0275899 A1 | 10/2013 | Schubert et al. | |
| 2014/0067375 A1 | 3/2014 | Wooters | |
| 2014/0142924 A1 | 5/2014 | Friedman | |
| 2014/0149112 A1 | 5/2014 | Kalinli-Akbacak | |
| 2014/0180692 A1 * | 6/2014 | Joshi | G06F 17/271 704/254 |
| 2014/0278343 A1 | 9/2014 | Tran | |
| 2014/0316782 A1 | 10/2014 | Tzirkel-Hancock et al. | |
| 2015/0032443 A1 | 1/2015 | Karov et al. | |
| 2015/0066479 A1 | 3/2015 | Pasupalak et al. | |
| 2015/0169758 A1 | 6/2015 | Assom et al. | |
| 2015/0364128 A1 | 12/2015 | Zhao et al. | |
| 2016/0034448 A1 | 2/2016 | Tran | |
| 2016/0048504 A1 | 2/2016 | Narayanan | |
| 2016/0062981 A1 | 3/2016 | Dogrultan et al. | |
| 2016/0078866 A1 | 3/2016 | Gelfenbeyn et al. | |
| 2016/0180853 A1 | 6/2016 | Vanlund et al. | |
| 2016/0188610 A1 * | 6/2016 | Bhatia | G06F 40/284 707/738 |
| 2016/0259767 A1 | 9/2016 | Gelfenbeyn et al. | |
| 2016/0260029 A1 | 9/2016 | Gelfenbeyn et al. | |
| 2016/0314791 A1 | 10/2016 | Wang et al. | |
| 2016/0322050 A1 | 11/2016 | Wang et al. | |
| 2016/0342702 A1 | 11/2016 | Barve et al. | |
| 2017/0148073 A1 | 5/2017 | Nomula et al. | |
| 2017/0228372 A1 | 8/2017 | Moreno et al. | |
| 2017/0300831 A1 | 10/2017 | Gelfenbeyn et al. | |
| 2017/0309149 A1 | 10/2017 | Kaura | |
| 2017/0316777 A1 * | 11/2017 | Perez | G06F 17/279 |
| 2017/0323636 A1 * | 11/2017 | Xiao | G06F 17/2775 |
| 2017/0330077 A1 | 11/2017 | Williams et al. | |
| 2018/0061408 A1 | 3/2018 | Andreas et al. | |
| 2018/0114522 A1 | 4/2018 | Hall et al. | |
| 2018/0293483 A1 | 10/2018 | Abramson et al. | |
| 2019/0066660 A1 * | 2/2019 | Liang | G06F 17/27 |
| 2020/0193970 A1 | 6/2020 | Liang et al. | |

FOREIGN PATENT DOCUMENTS

| | | |
|---|---|---|
| WO | 2006016308 A1 | 2/2006 |
| WO | 2006037219 A1 | 4/2006 |
| WO | 2014015267 A2 | 1/2014 |
| WO | 2016114922 A1 | 7/2016 |

OTHER PUBLICATIONS

"Non-Final Office Action Issued in U.S. Appl. No. 15/669,795", dated Jul. 11, 2018, 13 Pages.

"International Search Report and Written Opinion Issued in PCT Application No. PCT/US2017/048384", dated Nov. 22, 2017, 6 Pages.

"International Search Report and Written Opinion Issued in PCT Application No. PCT/US2017/048384", dated May 2, 2018, 7 Pages.

"International Search Report and Written Opinion Issued in PCT Application No. PCT/US2017/048384", dated May 29, 2018, 10 Pages.

(56) References Cited

OTHER PUBLICATIONS

"International Search Report and Written Opinion Issued in PCT Application No. PCT/US2017/048384", dated Jan. 5, 2018, 5 Pages.
PCT Application No. PCT/US2017/060134 International Search Report and Written Opinion dated Jan. 29, 2018.
"Final Office Action Issued in U.S. Appl. No. 15/669,795", dated Jan. 7, 2019, 19 Pages.
"Non Final Office Action Issued in U.S. Appl. No. 15/892,194", dated Feb. 25, 2019, 12 Pages.
"Final Office Action Issued in U.S. Appl. No. 15/892,194", dated Oct. 10, 2019, 11 Pages.
"Non Final Office Action Issued in U.S. Appl. No. 15/974,650", dated Dec. 26, 2019, 13 Pages.
"Non Final Office Action Issued in U.S. Appl. No. 15/904,125", dated Jul. 12, 2019, 15 Pages.
"Extended European Search Report Issued in European Patent Application No. 18756646.8", dated May 27, 2020, 8 Pages.
"Extended European Search Report Issued in European Patent Application No. 18751475.7", dated Apr. 20, 2020, 11 Pages.
"Extended European Search Report Issued in European Patent Application No. 17867628.4", dated May 15, 2020, 9 Pages.
"Notice of Allowance Issued in U.S. Appl. No. 16/036,622", dated Mar. 10, 2020, 10 Pages.
"Non Final Office Action Issued in U.S. Appl. No. 16/115,491", dated May 13, 2020, 15 Pages.
"Final Office Action Issued in U.S. Appl. No. 15/974,650", dated Jun. 9, 2020, 9 Pages.
"Non Final Office Action Issued in U.S. Appl. No. 15/974,650", dated Sep. 15, 2020, 8 Pages.

\* cited by examiner

FIGURE 20

DATA COLLECTION FOR A NEW CONVERSATIONAL DIALOGUE SYSTEM

CROSS REFERENCE TO RELATED APPLICATIONS

This application claims the priority benefit of U.S. Provisional Application Ser. No. 62/418,035, titled "Data Collection for a New Conversational Dialogue System," filed Nov. 4, 2016, the disclosure of which is incorporated herein by reference.

BACKGROUND

Fluent conversational systems are difficult to design. The complexities of natural language, coupled with large personal freedom of expression, make prescriptive natural language interfaces hard to engineer so that they cover the space of potential interactions. In addition, such a system which is capable of all the tasks in a particular topic is very difficult to use because it cannot analyze the variety of sentences spoken by the user, nor does it capture the possibilities for actions and language produced by the system.

The problem is a chicken-and-egg problem—a system could use a Wizard of Oz (WOZ) system to create a model of the conversational system, and then persuade large numbers of human users to interact with the system. This is expensive, as the "conversational system" must be represented by a human operator, and it will be likewise constrained to operate in the space of human operator utterances (each operator has idiosyncratic utterances which constrain the WOZ data unnaturally).

However, it is possible to use the WOZ scenario to bootstrap a conversational system. Such a system would work by creating a user interface for the system in a particular topic, (often a web interface), and then by coercing or otherwise persuading people to use the system to do a task (say, book a flight) by talking with the system (or typing to it), and following a series of interchanges until the flight is successfully booked or the task is abandoned. This technique was used to good advantage to bootstrap the ATIS (Airline Transportation Information System) DARPA project to fill in an airline ticket, but the task was much simpler than those required for practical use.

An alternative is to create a system from scratch, by intuiting the things that the users and agents could say (and the actions that the agent could take). This leads to an extremely inefficient interchange for the uninformed user, as the system is constrained to the idiosyncrasies of the developing engineer. One could bootstrap from this actual system (providing that some form of machine learning was available to include previously unseen elements into the system), but the development of such a system is difficult. Chatbots, the current craze, have not been shown to be successful as progenitors of conversational systems.

What is needed is an improved way to train dialogue systems

BRIEF DESCRIPTION OF FIGURES

FIG. 20 illustrates another user interface provided by the present system.

SUMMARY

Figure 1:
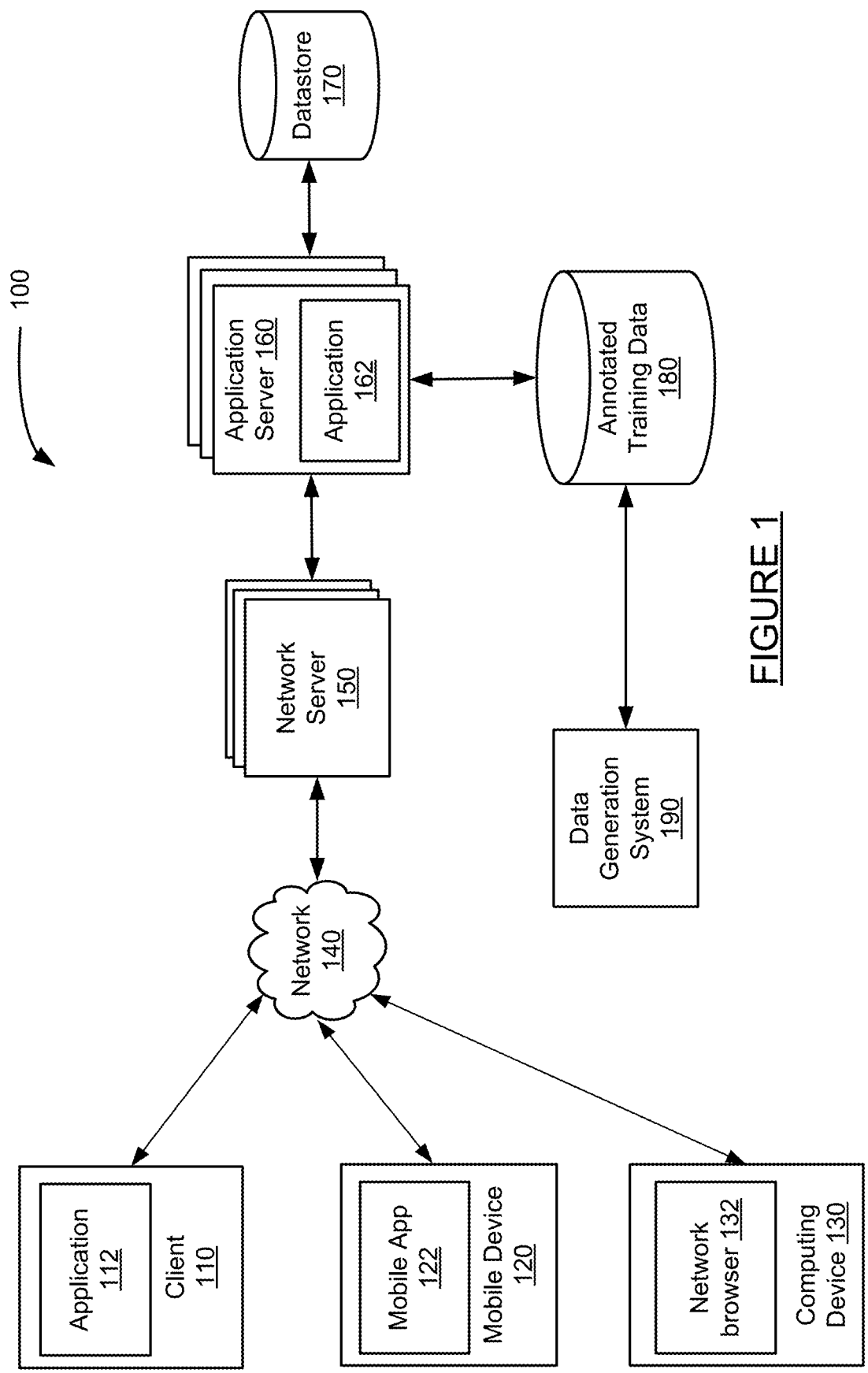
FIG. 1 is a block diagram of a system that collects and uses annotated data.

A data collection system is based on a general set of dialogue acts which are derived from a database schema. Crowd workers or other users perform two types of tasks: (i) identification of sensical dialogue paths and (ii) performing context-dependent paraphrasing of these dialogue paths into real dialogues. The end output of the system is a set of training examples of real dialogues which have been annotated with their logical forms. This data can be used to train all three components of the dialogue system: (i) the semantic parser for understanding context-dependent utterances, (ii) the dialogue policy for generating new dialogue acts given the current state, and (iii) the generation system for both deciding what to say and how to render it in natural language.

In some instances, the data generation system of the present technology may generate a plurality of canonical utterances from logical forms and associate annotation with the plurality of canonical utterances. The annotated canonical utterance data inherently includes information about dialog flow and utterance transition, which can be used to train dialog systems.

In embodiments, a method is described for generating annotated dialogue system training data. In the method, a data generation application receives a first input from a user as a step in a multi-step dialog. The data generation application generates a first list of a plurality of canonical utterances from a plurality of logical forms, wherein the plurality of logical forms generated in response to the input received from the user. A selection is received, from a user, of one of the plurality of canonical utterances from the first list. A second list of a plurality of canonical utterances is generated from a plurality of logical forms, wherein the plurality of logical forms generated in response to the user selection from the first list. A selection is received, from a user, of one of the plurality of canonical utterances from the second list. A natural language paraphrase can be received from the user, wherein the natural language paraphrase is associated with the first selected canonical utterance and the second selected canonical utterance. The natural language paraphrase, first selected canonical utterance, and the second selected canonical utterance are then stored.

In embodiments, a system can generate annotated dialogue system training data. The system can include a processor, memory, and one or more modules stored in memory and executable by the processor. When executed, the modules can receive, by a data generation application executing on a machine, a first input from a user as a step in a multi-step dialog, generate, by the data generation application, a first list of a plurality of canonical utterances from a plurality of logical forms, the plurality of logical forms generated in response to the input received from the user, receive from the user a selection of one of the plurality of canonical utterances from the first list, generate a second list of a plurality of canonical utterances from a plurality of logical forms, the plurality of logical forms generated in response to the user selection from the first list, receive from the user a selection of one of the plurality of canonical utterances from the second list, receive a natural language paraphrase from the user, the natural language paraphrase associated with the first selected canonical utterance and the second selected canonical utterance, and store the natural language paraphrase, first selected canonical utterance, and the second selected canonical utterance.

DETAILED DESCRIPTION

The present technology, roughly described, is a data collection system based on a general set of dialogue acts which are derived from a database schema. Crowd workers perform two types of tasks: (i) identification of sensical dialogue paths and (ii) performing context-dependent paraphrasing of these dialogue paths into real dialogues. The end output of the system is a set of training examples of real dialogues which have been annotated with their logical forms. This data can be used to train all three components of the dialogue system: (i) the semantic parser for understanding context-dependent utterances, (ii) the dialogue policy for generating new dialogue acts given the current state, and (iii) the generation system for both deciding what to say and how to render it in natural language.
Introduction In some instances, the data generation system of the present technology may generate a plurality of canonical utterances from logical forms and associate annotation with the plurality of canonical utterances. The annotated canonical utterance data inherently includes information about dialog flow and utterance transition, which can be used to train dialog systems.

If one has a conversational system designed to be informed by machine learning, then the problem is largely a matter of creating data with which to train the model. Prescriptive models of the systems themselves, and WOZ models of the system, are both difficult to manage and offer only incomplete training data.

One technique for creating training data for a dialogue system was published by Yushi Wang, Jonathan Berant, and Percy Liang in 2015 (ACM), titled "Building a Semantic Parser Overnight". In this paper, the authors developed a method for obtaining training data for a simple command-and-control system with logical forms. Their system took as input a database schema of possible logical form primitives, and generated a core set of logical forms. These logical forms are shown to crowd workers as pseudo-English canonical utterances, and the crowd workers write down real natural language utterances that target the underlying logical forms. The system is described in FIG. 1 of the Wang-Berant-Liang paper. These natural language paraphrases paired with the underlying logical forms then became the training data for the command-response system.

To adapt this idea from a command-and-control system to a conversational system requires significant modifications. There are two primary changes: First, while exhaustive generation of logical forms for a command-and-control system is tenable, the set of possible dialogues is much too large. Second, the representation of the dialogue state and dialogue acts can be quite complex and must be nailed down.

The modified data collection system of the present technology is based on a general set of dialogue acts which is derived from a database schema. Crowd workers can perform two types of tasks in the present system: (i) identification of sensical dialogue paths and (ii) performing context-dependent paraphrasing of these dialogue paths into real dialogues. The end output of the system is a set of training examples of real dialogues which have been annotated with their logical forms. This data can be used to train all three components of the dialogue system: (i) the semantic parser for understanding context-dependent utterances, (ii) the dialogue policy for generating new dialogue acts given the current state, and (iii) the generation system for both deciding what to say and how to render it in natural language.

Here is an example of how the scheme would work for a simple text messaging domain:

1. Developers write down or use code to automatically gather the database schema for a new domain.

TextMessage={contents:Message, phone_number: PhoneNumber}

2. The framework defines the complete tree of possible dialogues, where each path is a sequence of actions (dialogue act), and each node is a state of the dialogue. Actions are rendered as canonical utterances, which is a pseudocode way of showing the underlying logical form. Here is an example path:

user: add [create TextMessage] to tasks agent:TextMessage: request recipient_phone_number?

user: TextMessage: request recipient_phone_number to be 617-123-4567 user: TextMessage: request contents to be "buy groceries"

3. Crowdworkers rate each action coming out of a state as either good or bad. For example, right after the user creates a TextMessage, it is unlikely that the agent will ask what the user wants, whereas asking for the phone number is very sensible.

4. For the valid branches of the tree, crowdworkers write context-dependent natural language utterances, which form the final dialogue:
   user: I'd like to send a text
   agent: to whom?
   user: to 617-123-4567, saying "buy groceries"

In this new system, dialogues are created one interchange at a time, and the crowd workers (used to create data from the system) judge the created utterances and actions which the system proposes as valid or not. For valid utterances, the crowd worker offers at least one paraphrase in natural language, and that paraphrase is recorded in the data which will later be used to train an actual conversational system.

The database schema created in step 1 above is a rule-based description of elements and actions which can be taken. Unlike a rule-based bot or a full dialogue system, the rules govern the creation and concatenation of logical elements of a conversation, which are not necessarily the actual words which a user/system would utter in a real conversation. While the rules are expected to capture much of the logical description of the conversational system, the natural language paraphrases provided by the crowd workers, when fed to a machine learning system, will learn the relevant nuances of natural language interchanges in the new domain.

The data generation system of the present technology may be used to generate annotated data and provide the data for training to a dialogue and/or automated assistant system. FIG. 1 is a block diagram of a system that collects and uses annotated data. System 100 of FIG. 1 includes client 110, mobile device 120, computing device 130, network 140, network server 150, application server 160, and data store 170. Client 110, mobile device 120, and computing device 130 communicate with network server 150 over network 140. Network 140 may include a private network, public network, the Internet, and intranet, a WAN, a LAN, a cellular network, or some other network suitable for the transmission of data between computing devices of FIG. 1.

Client 110 includes application 112. Application 112 may provide automatic speech recognition, speech synthesis, paraphrase decoding, transducing and/or translation, paraphrase translation, partitioning, an automated assistant, and other functionality discussed herein. Application 112 may be implemented as one or more applications, objects, modules or other software. Application 112 may communicate with application server 160 and data store 170, through the server architecture of FIG. 1 or directly (not illustrated in FIG. 1) to access the large amounts of data.

Mobile device 120 may include a mobile application 122. The mobile application may provide automatic speech recognition, speech synthesis paraphrase decoding, transducing and/or translation, paraphrase translation, partitioning, an automated assistant, and other functionality discussed herein. Mobile application 122 may be implemented as one or more applications, objects, modules or other software.

Computing device 130 may include a network browser 132. The network browser may receive one or more content pages, script code and other code that when loaded into the network browser provides automatic speech recognition, speech synthesis paraphrase decoding, transducing and/or translation, paraphrase translation, partitioning, an automated assistant, and other functionality discussed herein.

Network server 150 may receive requests and data from application 112, mobile application 122, and network browser 132 via network 140. The request may be initiated by the particular applications or browser applications. Network server 150 may process the request and data, transmit a response, or transmit the request and data or other content to application server 160.

Application server 160 includes application 162. The application server may receive data, including data requests received from applications 112 and 122 and browser 132, process the data, and transmit a response to network server 150. In some implementations, the responses are forwarded by network server 150 to the computer or application that originally sent the request. Application's server 160 may also communicate with data store 170. For example, data can be accessed from data store 170 to be used by an application to provide automatic speech recognition, speech synthesis, paraphrase decoding, transducing and/or translation, paraphrase translation, partitioning, an automated assistant, and other functionality discussed herein. Application server 160 includes application 162, which may operate similar to application 112 except implemented all or in part on application server 160.

Data generation system 190 may generate data that can be used to train semantic language models. The data generated by system 190 may be stored in annotated training data 180, which can be accessed by application 162. The data may include logical form data and canonical data for a path of utterances, as well as annotations for a plurality of paths with the dialogue. Data generation system 190 is discussed in more detail with respect to FIG. 2 and elsewhere herein.

Figure 2:
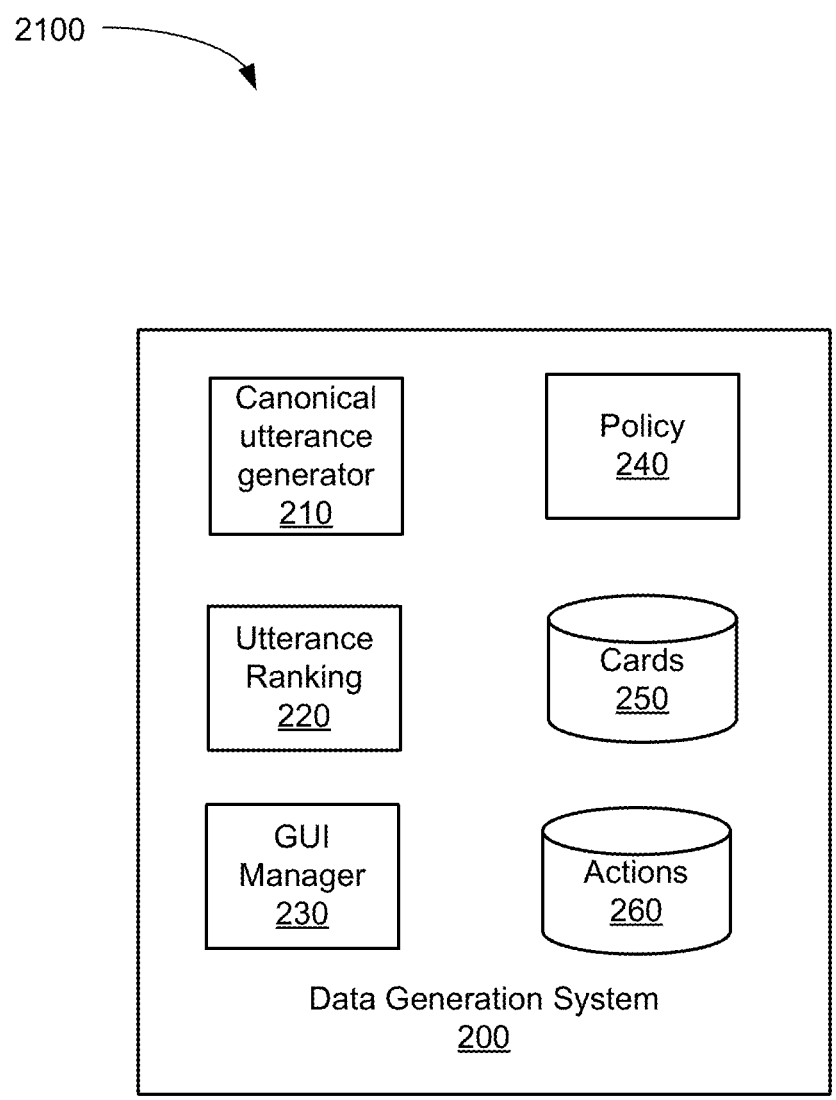
FIG. 2 is a block diagram of a data generation system.

FIG. 2 is a block diagram of a data generation system. The data generation system 200 of FIG. 2 provides more detail for generation system 190 of FIG. 1 and includes canonical utterance generator 210, utterance ranking module 220, GUI manager 230, policy 240, cards datastore 250 and actions datastore 260.

Canonical utterance generator 210 generates canonical utterances from logical forms retrieved from a datastore. The Canonical utterances can be ranked by utterance ranking module 220 and displayed by an interface which is populated, rendered and managed by GUI manager 230. Policy 240 maintains policy information used and applied by the data generation system 200. Cards data store 250 stores card data and handles queries for card information. Actions data store 260 stores action data and handles queries for action information. Cards, actions and policies are discussed in more detail below.

Representation

The present system has a simple, declarative representation of the dialogue state.

CardType (analogous to a class, or the schema of a database table)
   Contains the following information
     name (singular proper noun)
     a list of fields, where each field has a name, an arity (either 1 or 1+), and a CardType.
     a list of super card types, which means
       the effective list of fields includes those of all super card types
       any super card type is abstract, and the agent will ask what concrete card type to create
   Logic (not implemented)
     constraints (=, <=, >=, !=) relating the fields
       e.g., departure_date<=arrival_date
     functionality
       e.g., each day can only have one high temperature
   Examples
     TextMessage={contents:Message, phone_number: PhoneNumber}

BaseballGame<Activity={team1:BaseballTeam, team2:BaseballTeam, location:Stadium}
Primitive CardTypes
    Enum: AirlineName, PhoneNumber
    Numeric: Money, Time, Duration, Date, Temperature, ...
A Schema is a collection of CardTypes, and is a full specification of the universe of things that can exist.
Card
    Note: a Card is not an instance of CardType.
    Contains the following information
        Mode: can either be create (a new database record under this CardType) or query (for an existing database record)
            Example: Sending a text message is a create card
            Example: Finding a flight is a query card
        For each field, a composite Expression or null, where
            Expression::=Value (placeholders ${value:Date}) |Not(Expression)|And(Expression, Expression) |Expression+${offset}|LessThan (Expression)| . . . |Get(Path)
            In practice, the size of the expressions are limited.
            An expression can refer to a Path, which refers to any subcard in the system.
        A sort field (increasing or decreasing): which field to sort by
        A cursor (integer) into the list of result.
        List of results that have been reported
            Contains a list of records, where each record has a subset of its fields, which has been reported by the agent.
            Contains values of fields across multiple records (e.g., min and max, count).
        Note that each sub-card can be accessed by a path
            Example: FlightBooking/item/returning_leg/departure_date
Action (operations on cards that produce other cards): these are analogous to logical forms in semantic parsing (closer to execution than to language)
    card_add(path, field, new_expr|new_ctype, new_mode): write card, by user
        <path>.<field>.add(<new_expr>);
        <path>.<field>.add(new<new_ctype>(<new_mode>));
        user: set origin to BOS
        agent: set origin to BOS # for setting defaults
        agent: set origin to BOS?
    card_remove(path, field, index): write card, by user
        <path>.<field>.removeAt([<index>]);
        user: forget the origin
        agent: forget the origin
        agent: forget the origin?
    card_sort(path, field): write card, by user
        user: sort by arrival time
    card_info(path, field?): read card, by user or agent
        print<path>.<field>;
        user: what's the current flight search?
        agent: currently, departure date is . . . , departure time is . . .
    db_info(path, field): by user or agent
        user: what are the prices?
        agent: prices are<minvalue>, . . . , <maxvalue>
    db_cursor(path, direction): write card, by user or agent
        user: next|previous|first|last result
    db_result(path, field): by user or agent
        user: what's the current result?
        agent: current result is . . .
    db_create(path): by user or agent
        user: book it
        agent: booked it
    db_delete(path): by user or agent
        user: delete it
        agent: deleted it
    There are two aspects of each action:
        who=user or agent
        doit=False or True (applicable only to actions that change the state)
            For user, doit is true when write to card (represents shared mental state)
            For agent, doit is true when write to DB (represents world state)
Example
    user: What's the current time?
        current_situation.result.time?
    agent: 3 pm
        print current_situation.result.time
    I'd like to fly from SFO to BOS tomorrow
        task.add(new FlightIinerary(query))
        task[0].outgoing_leg.origin.name=SFO
        task[0].outgoing_leg.destination.name=BOS
        task[0]
            .outgoing_leg.departure_date=current_situation.date+1
    agent: I found a flight for $300 on American
        print task[0].result.price
        print task[0].result.airline
    user: what's the weather when I get there?
        task.add(new WeatherReport(query))
        task[1].date=thing[0].outgoing_leg.arrival_date
        task[1].location=thing[0].outgoing_leg. destination.city
    agent: 6 pm
        print task[1].result[0].temperature
    user: email that to me
        task.add(new EmailMessage(create))
        task[2].recipient=me.email_address
        task[2].message=thing.result
        task[2].create( )
The dialogue State contains
    root card: the current state of affairs
    dialogue history: list of actions (not used by actions)
Generating Dialogues
Given the above representation, the present system first defines a generator, which takes a state and an action and produces a canonical utterance for this action. This is a simple rule-based system that maps the underlying logical form to an English-like pseudocode. In earlier versions, the present system attempted to use more pure natural language (e.g., "For the create TextMessage task, what would you like the contents to be?"), but this turned out to a lot harder for crowd workers to read than to have a shorthand that's more concise (e.g., "TextMessage: request contents?")
A policy is used to map a state to a ranking over actions. Given a state, the present system first generates the possible set of actions (there can be a few hundred depending on the complexity of the state). Then the present system defines a parametrized score for each (state, action) pair. The features include indicators on various abstractions of the (state, action). For example, one feature captures the identity of the last two actions not including the arguments. Another feature would capture the equivalence structure of the arguments (e.g., to capture that if the agent requests a field, then the user will likely reply with that field). The weights of the model are learned from the user ratings.

The model is instantiated in a user interface where a crowd worker is presented with logical forms which make up the sentences in a dialogue in sequential order. His/her task is to paraphrase the utterances (could be text strings) of the system in natural language, and where the system offers more than one possible response to a "user" utterance, to choose one of the possibilities as the extension of the conversation, and again to provide at least one paraphrase of the logical form.

Logical forms which are not sensible, or which cannot be "parsed" by the system, come in several flavors:
1. The generator of possible utterances overgenerates composite logical forms, and they might not make any sense. These will be marked by the crowdworker, and either ignored or analyzed to see if the system might render equivalent information in sensible form
2. The user utterance cannot be understood by the system. In that case, either the system might lack a fundamental analysis element, or the system capabilities do not extend to this type of utterance. In any case, these will be analyzed for possible extension of either the model system itself or of the domain which the system covers.

When the user interface is used to create dialogues there may be three participants:
 a. The dialogue creator (crowdworker)
  i. The person actually using the interface
  ii. Could be familiar with the system or not
  iii. Could be making up a dialogue, or simply choosing action sequences for a pre-defined dialogue
  iv. When using the interface, the dialogue creator paraphrases the system states and utterances into natural languages
 b. The "user"
  i. The imaginary person who is using the system
  ii. Is modeled by the creator as the person talking with the system
  iii. Is trying to accomplish some task
  iv. Creates or chooses system actions or dialogs
 c. The "agent"
  i. The imaginary personage of the system
  ii. Can talk to the user and can take actions on the part of the user
  iii. Is generally restricted to those actions/utterances which the system designer has defined
  iv. Can have extended capabilities implemented as free-form dialogues which will be used by system analyzers to extend the system's capabilities
  v. Speaks and acts in some meta-language which defines the actual internal states and utterances of the system The user interface may operate to create dialogues where each system action, utterance, or combination of these is paired with a natural language paraphrase. These paraphrases and system actions and/or states automatically create training data for the actual system, since the system states are now paired with natural language utterances which together create a natural language dialogue which the system could have had.

The user interface comes with general instructions for the dialogue creator, as follows:
The user can, in some instances, have two primary goals:
 Rate machine-generated options logically valid or not
 Write natural-sounding dialogues that convey the same meaning.
What to do:
 Look at the candidate machine-generated utterances given the current dialogue so far.
 Find a suitable next user or agent utterance (use the search to filter).
 Click on the machine-generated utterance and enter the placeholders to advance the dialogue.
 When you've clicked on one or more machine-generated utterances that constitute a single natural utterance, write the corresponding natural utterance in the box corresponding to the last machine-generated utterance.
 When you're done with the dialogue, click on [beginning of dialogue] or any intermediate step to continue from there.
Example Dialogue Below are some example dialogues which could be produced by the present system. The MGU is the machine generated utterance that the system generated and the crowd worker chose. The Action is the internal action the system took which corresponds with that MGU. The Paraphrase is the natural language description, provided by the crowd worker, of all MGUs since the last Paraphrase. Rows where the User is the actor and where the Agent is the actor are labeled as such in the first column.

| Actor | MGU | Action | Paraphrase |
|---|---|---|---|
| User | I would like to create a TextMessage as a task | card_add(field:task,ctype:TextMessage,mode:create,path:[ ]) | |
| User | I would like to find a Contact as task. | card_add(field:task,ctype:Contact,mode:query,path:[ ]) | |
| User | For the find Contact task: I would like the nickname to be sister. | card_add(field:nickname,expr:${nickname:ContactNickname},path:[[task,1]]) | |
| User | For the create TextMessage task: I would like the recipient phone number to be recipient phone number of the create TextMessage task. | card_add(field:recipient_phone_number,expr:[get,[[task,0],[recipient_phone_number,0]]],path:[[task,0]]) | Send a message to my sister. |
| Agent | For the create TextMessage task: Currently, contents is not specified. What would you like it to be? | card_info(field:contents,path:[[task,0]]) | What would you like to say to your sister? |

-continued

| Actor | MGU | Action | Paraphrase |
|---|---|---|---|
| User | For the create TextMessage task: I would like the contents to be are you coming to dinner tonight?. | card_add(field:contents,expr: ${contents:Text},path:[[task,0]]}) | Ask if she is coming to dinner tonight |
| Agent | For the create TextMessage task: Created it! | db_create(path:[[task,0]]) | Okay, sent. |
| User | I would like to create a TextMessage as task. | card_add(field:task,ctype:Text Message,mode:create,path:[ ]) | |
| User | I would like to find a Contact as task. | card_add(field:task,ctype:Contact, mode:query,path:[ ]) | |
| User | For the 4-th find Contact task: I would like the nickname to be brother. | card_add(field:nickname,expr:$ {nickname:ContactNickname}, path:[[task,3]]) | |
| User | For the third create TextMessage task: I would like the recipient phone number to be mobile number of the 4-th find Contact task. | card_add(field:recipient_phone_number, exp:[get,[[task,3],[ mobile_number,0]]],path:[[task,2]]) | |
| User | For the third create TextMessage task: I would like the contents to be the contents of the first create TextMessage task. | card_add(field:contents,expr:[ get,[[task,0],[contents,0]]], path:[[task,2]]) | Oh, and ask my brother the same thing. |
| Agent | For the third create TextMessage task: Created it! | agent:db_create({doit:True, path:[[task,2]]}) | Alright, I asked you brother the same thing. |

Figure 3:
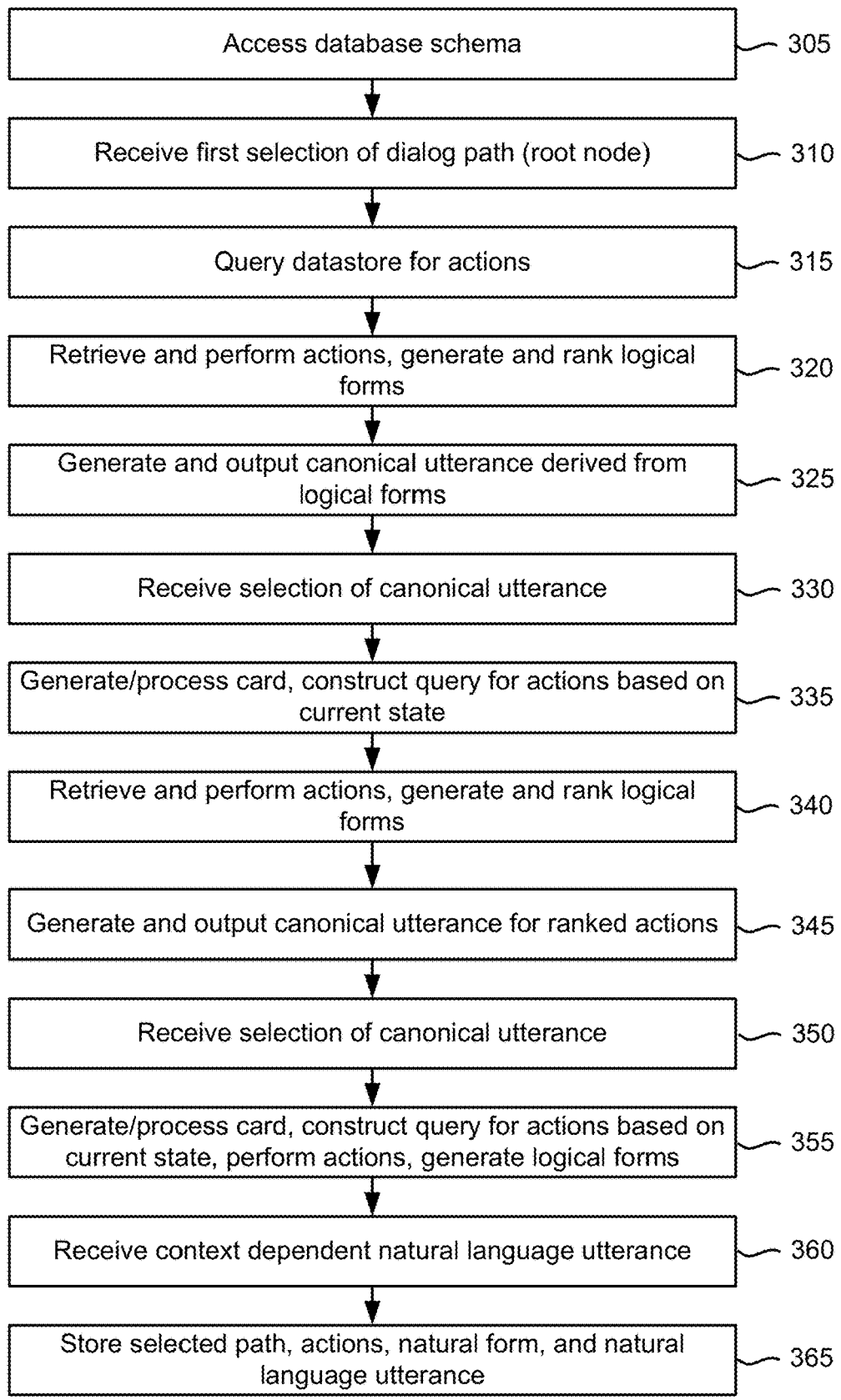
FIG. 3 is a method for generating annotated data.

FIG. 3 is a method for generating annotated data. A database schema is accessed at step 305. A first selection in a dialogue path is received from a user (crowd worker) at step 310. The first selection will correspond to a root node in the overall state of the dialogue. Next, a data store may be queried for actions at step 315. The query for actions may be generated based on the received selection at step 310. The datastore receives the query, prepares a response, and transmits the response back to the requesting module. The actions in the response can be performed, resulting in a number of logical forms being created. The logical forms can be ranked at step 320. In some instances, the logical forms may be ranked based on a model score, which may incorporate weightings based on previous user rankings, confidence levels, and other data.

Canonical utterances are generated from the logical forms and output at step 325. In some instances, only a subset of the logical forms is used to generate canonical utterances, such as for example the top ranked five or ten logical forms, those meeting a minimum score, or some other subset of the retrieved logical forms. In any case, a canonical utterance can be considered a pseudo-English translation of a logical form, which can be considered closer to a computer code format. The canonical utterances are output in an interface, which is discussed in more detail with respect to FIGS. 4 through 23.

A selection is then received for a particular canonical utterance at step 330. One or more cards are generated, modified, updated, deleted, or otherwise processed at step 335. The updated state, made up of one or more cards, is used to generate a query for a set of actions. A data store may be queried for the actions based on the current state, and the retrieved actions can be executed to generate logical forms at step 340. Canonical utterances may then be generated for each or a subset of the logical forms, and the canonical utterances may be output at step 345. A selection of a generated and output canonical utterance is received at step 350.

One or more cards are generated or processed in response to the selection, a query is generated based on the current state (based at least in part on the updated cards), actions are performed and logical forms are generated at step 355.

A natural language utterance is received at step 360. The natural language utterance may correlate to a plurality of canonical utterances in the current dialogue path. The natural language utterance may be context-dependent and may be associated with multiple steps in the dialogue within the overall dialogue path. The selected path of the dialogue, actions, the natural form, and the natural language utterance, as well as logical form from which the canonical utterances are generated, are stored at step 365.

The Present System User Interface

This is how the present system interface may be used to create an annotated dialogue. Note that the user of the interface (called the dialogue Creator here) is different from the imaginary user and different from the imaginary agent. It is the Creator's task to create an annotated conversational dialog.

At each time step there is a listing of the dialogue so far, a search box, and a long list of the possible dialogue extensions which are possible with the machine rules implemented in the present technology. The machine rules over-generate—that is, they produce both appropriate and inappropriate potential extensions of the dialog. The Creator's task is to pick appropriate extensions of the dialog. He/she may also be called upon to mark possible extensions as possible/impossible, but not in this example.

There is a summary of the current "knowledge" associated with the dialogue above and to the left of the dialogue history (often shown in the examples below). The figures are truncated, but almost all of them allow scrolling down the possible dialogue extensions to find the correct next step. The Creator may either scroll to the correct step, or he/she may use the search box to search either for a user action or for an agent action.

Finally, note that there is often a choice to enter free text. This is used when the creator cannot find a path to his/her preferred next step. These free text choices are used to indicate that the machine model is incomplete in some particular way, and free text choices may be analyzed by the system designers after-the-fact to augment the rules which describe the current conversational machinery.

Figure 4:
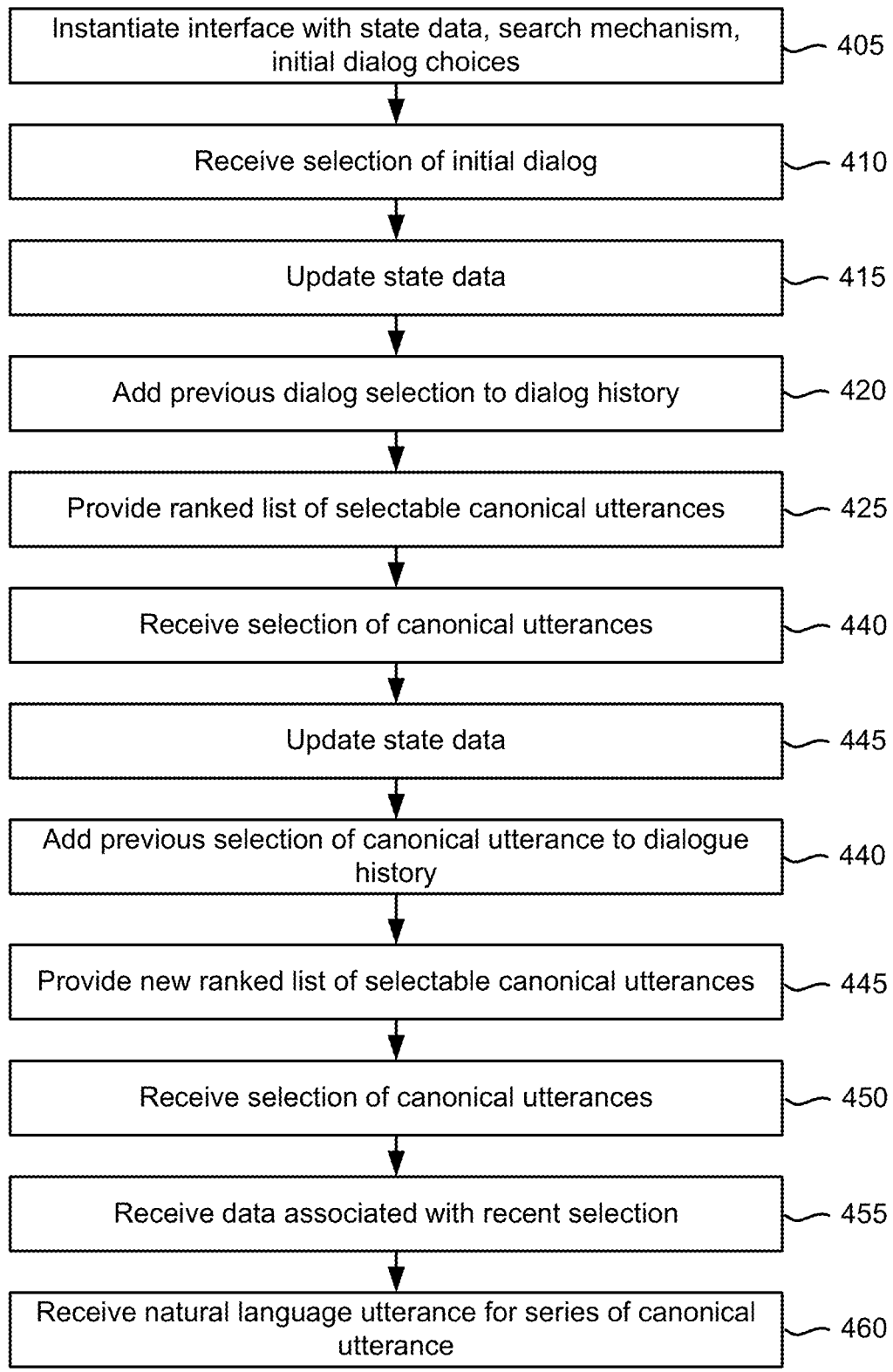
FIG. 4 is a method for annotating data through a user interface.

FIG. 4 is a method for annotating data through a user interface. First, at 405, an interface is instantiated with state data, a research mechanism, and an initial dialogue choice. State data may include the path taken so far, or a root node if no path has developed yet. The search mechanism may include a search box, selectable buttons, or other interface elements that enable a user to perform a search.

Figure 5:
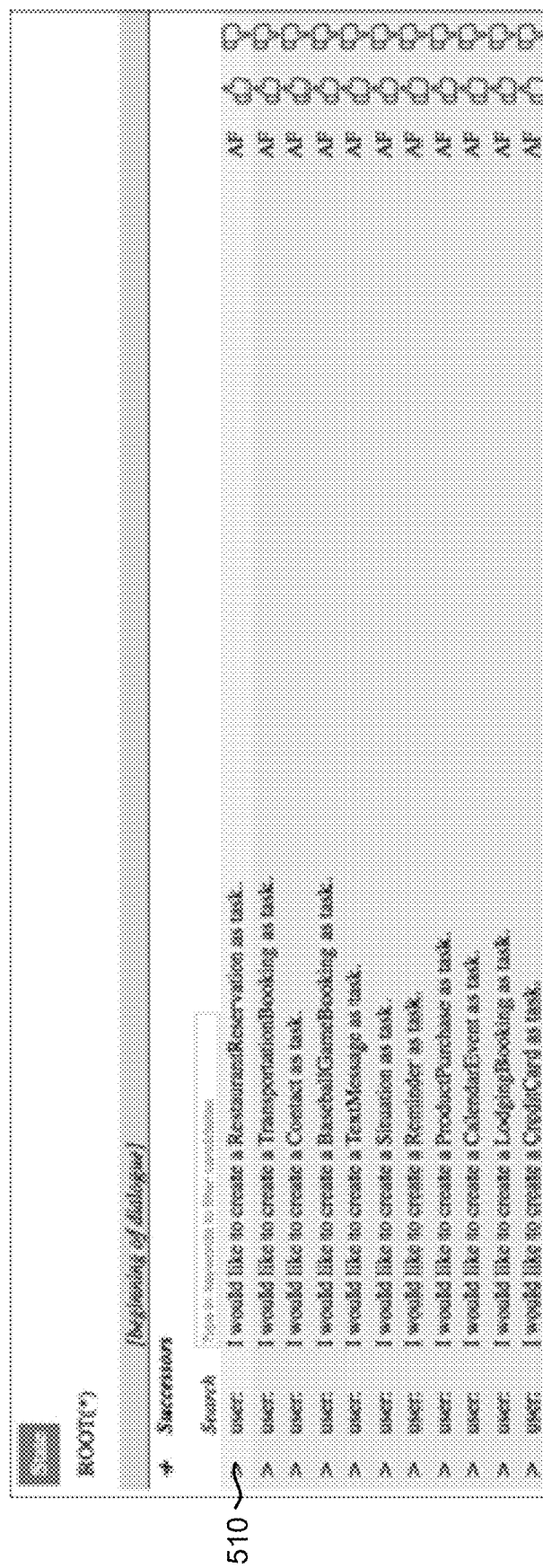
FIG. 5 illustrates another user interface provided by the present system.
Figure 6:
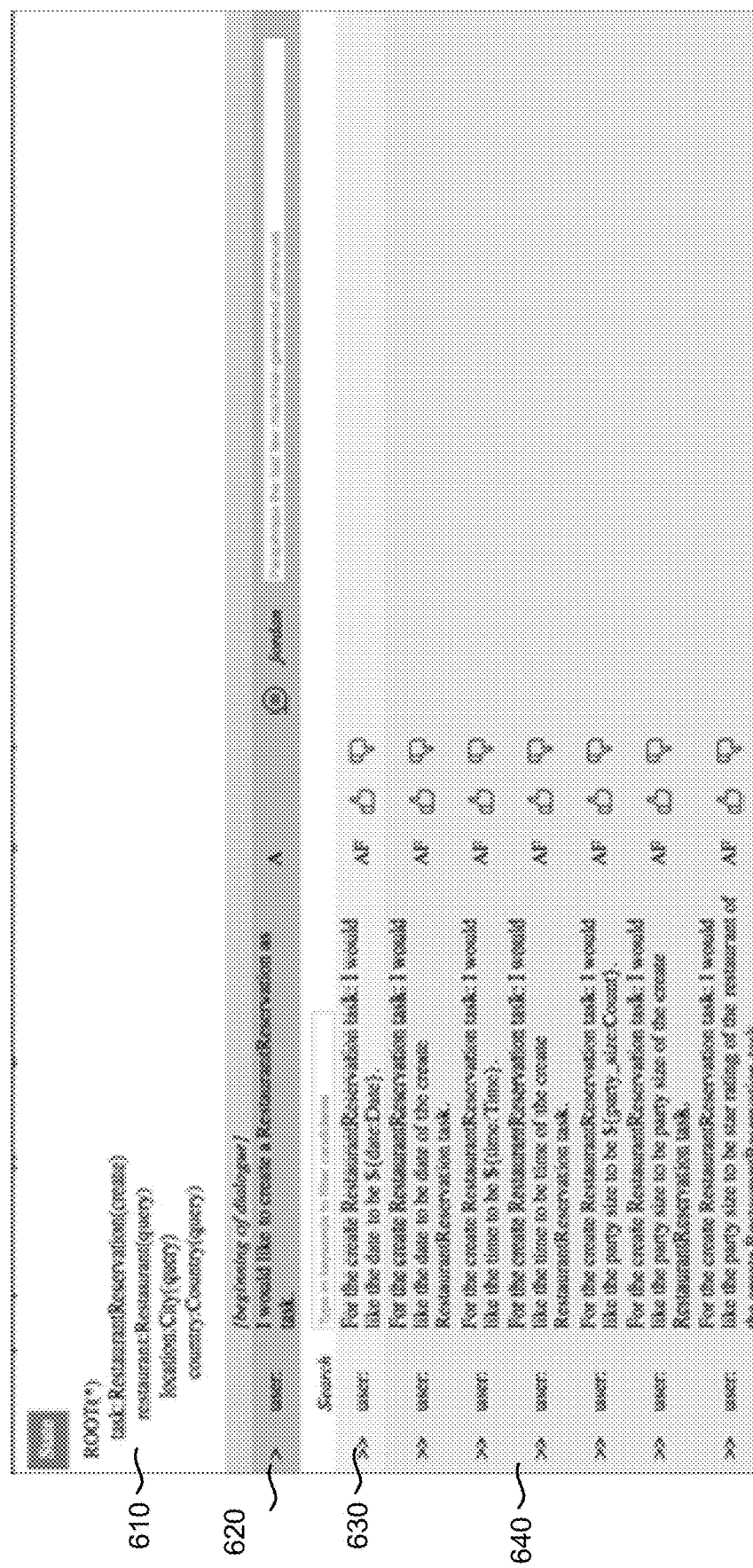
FIG. 6 illustrates another user interface provided by the present system.

A selection may be received for an initial dialogue at step 410. The initial dialogue choices, in an embodiment, are illustrated in the interface of FIG. 5. Once a selection is received, state data is updated at step 415. In the interface of FIG. 6, for example, state data including a root node is updated to include additional nodes within the dialogue path. The previous dialogue selection is added to a dialogue history portion of the interface at step 420. Referring to FIG. 6, the selected dialogue portion of "I would like to create a restaurant reservation as task" is added to the dialogue history.

A ranked list of selectable canonical utterances is provided to the user through the interface at step 425. In the interface of FIG. 6, six selectable canonical utterances are provided to the user. A selection is received for a canonical utterance at step 440. In response to the selection, the state data is updated at step 445 and the previous selection of the canonical utterance is added to the dialogue history at step 440. A new ranked list of selectable canonical utterances is then provided to user at step 445.

Figure 7:
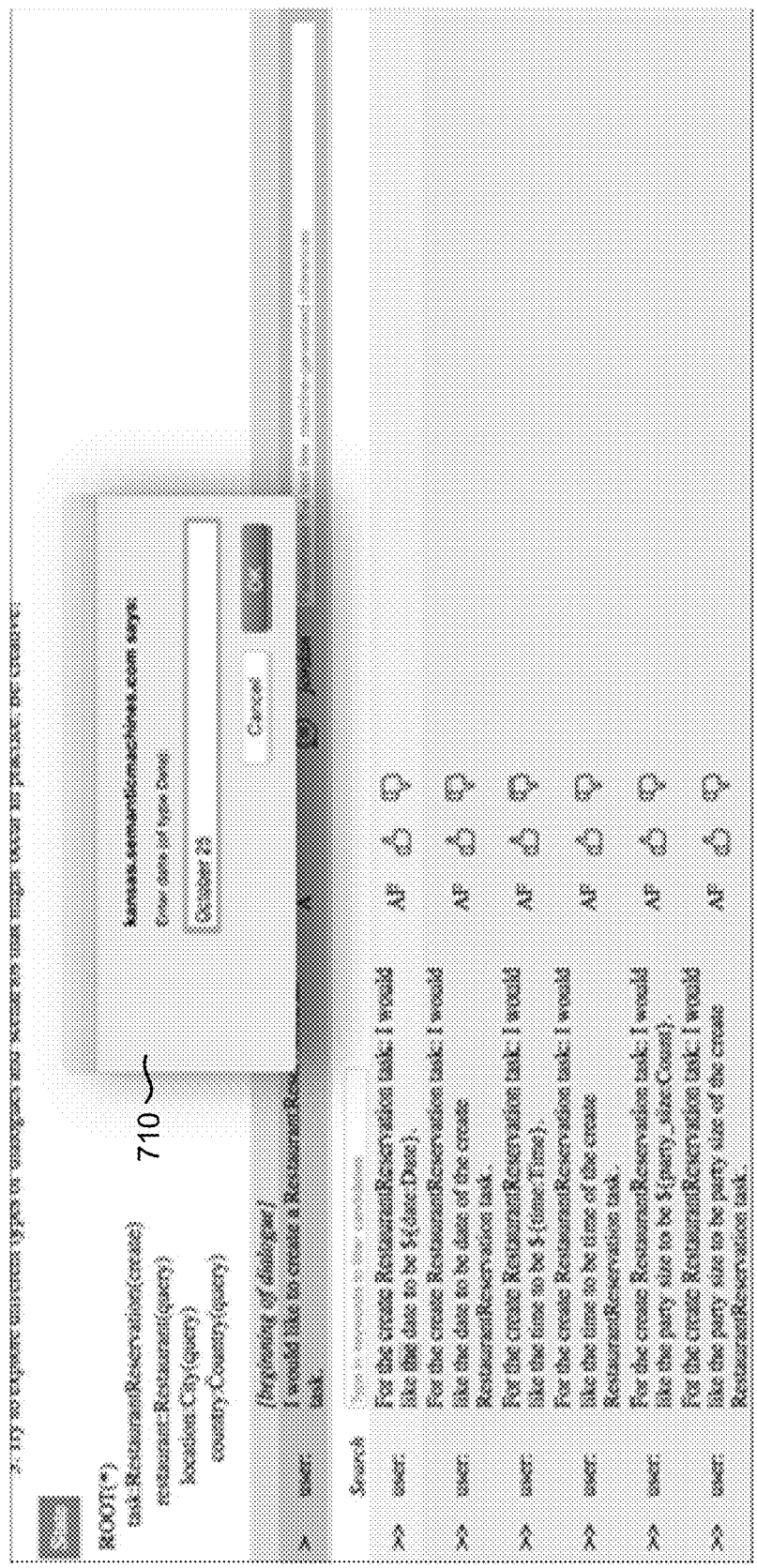
FIG. 7 illustrates another user interface provided by the present system.

A selection is received for one of the new canonical utterances at step 450. Data associated with the recent selection may be received at step 455. In the interface of FIG. 7, data in the form of a date—"October 25"—for a restaurant reservation is received within a pop-up box or window provided by the interface. The type of data received may depend on the particular cards, action, and canonical utterance within the context of the present dialogue.

A natural language utterance is received for a series of canonical utterances at step 460. The natural language utterance received from a user may be associated with a plurality of canonical utterances. As such, the natural language utterance serves as an annotation for the series of canonical utterances generated by the system and may be used to train other language generation models.

Examples of interfaces for generating annotated data are illustrated in FIGS. 5-23. FIG. 5 illustrates an initial interface. This interface displays a list of possible dialogues topics for a user (e.g., dialog creator or creator) to explore. Positioning a cursor, for example with a touch screen input or mouse input device, over one topic or otherwise providing input to select a particular topic results in a yellow highlight 510 for that topic.

The yellow line indicates a choice by the creator, made by moving the mouse to that line. If the creator then provides another input to select the highlighted topic line, an interface such as that of FIG. 6 is displayed by a device implementing the present technology.

FIG. 6 illustrates another interface provided by the present system. FIG. 6 illustrates the result of receiving input of an element of the display of FIG. 5. In particular, the logic implemented in code by the present technology indicate the selection of a Restaurant Reservation task.

A current state interface portion 610 indicates the current state of the dialog—including the root node and subsequent dialog paths. The dialog history is displayed within the interface at interface portion 620. Note that the restaurant reservation task is now part of the dialogue history, and has a box into which one may put a paraphrase. The Creator is not forced to select a paraphrase, however, and may instead choose to specify yet more of the system state visited by the user.

A series of seven canonical utterances are displayed below the dialog history. A first utterance in the seven canonical utterances is currently highlighted as being selected by the user. In FIG. 6, the creator has selected the specification of a date for the restaurant reservation as part of the dialog.

When the creator clicks on the date for a reservation (the click is received as input by the present system), the input results in the present system outputting a display as shown in FIG. 7.

FIG. 7 illustrates another display provided by the present system. FIG. 7 illustrates a display provided after receiving input in the display of FIG. 6. The creator can provide input to specify the date for which the user is requesting the reservation. In this instance, the user has provided input of "October 25" in the pop-up box 710. When a user provides input, e.g. a button click, that is received by the present system, the user is provided with a screen such as that displayed in FIG. 8.

Figure 8:
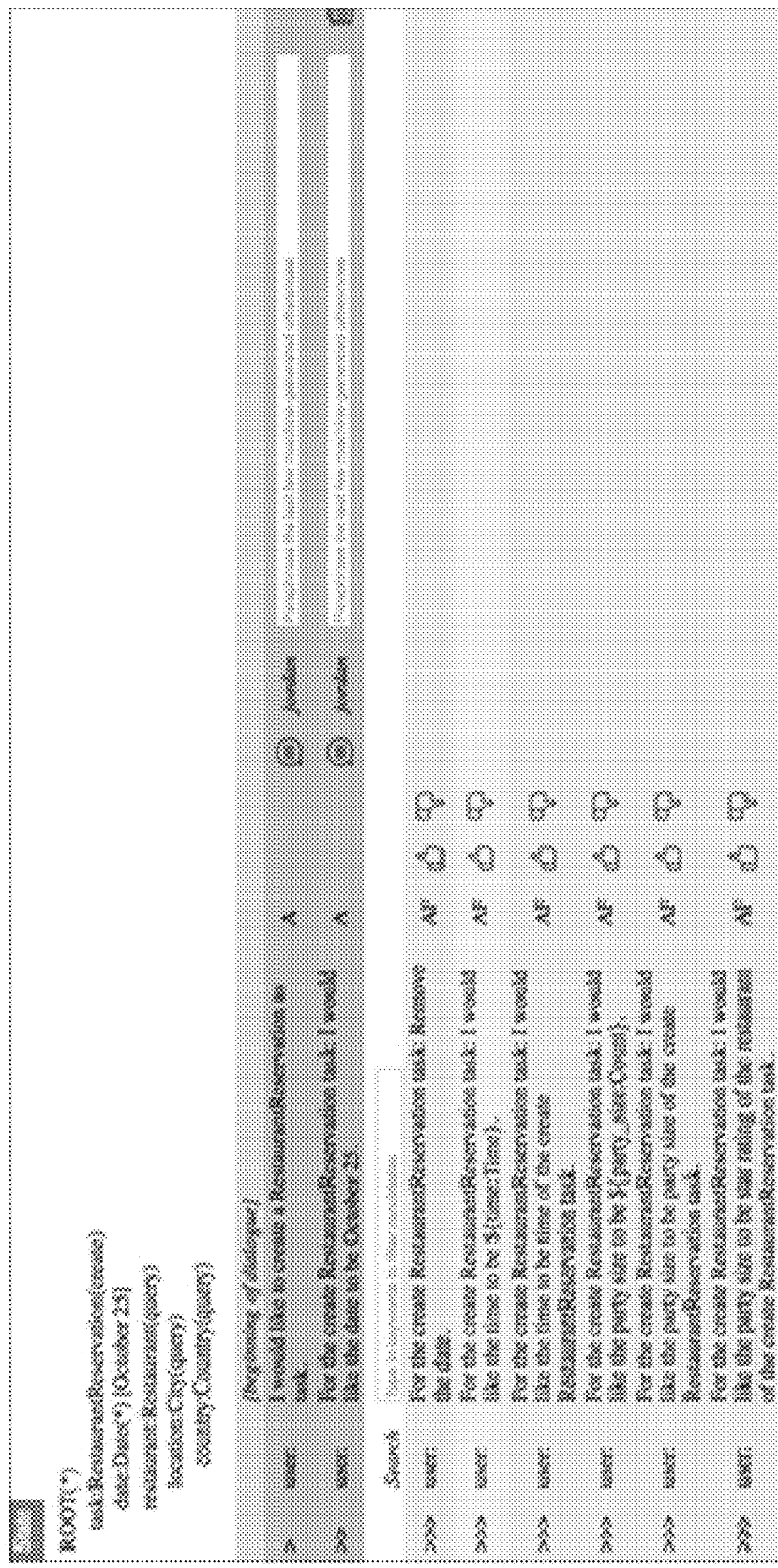
FIG. 8 illustrates another user interface provided by the present system.

FIG. 8 illustrates another display provided by the present system. In particular, FIG. 8 illustrates a display after the creator, acting for the user, provides an input. For example, the creator may provide an input by selecting a date for the reservation. Note that the date appears both in the dialogue history, and in the "dialogue state" found in the upper left of the display.

The creator may now extend the actions of the user by picking a line from the possible system actions which specify the time for the reservation, highlighted in FIG. 8 in yellow. Clicking on that time activity, the click input is received by the system which in return provides the display of FIG. 9.

Figure 9:
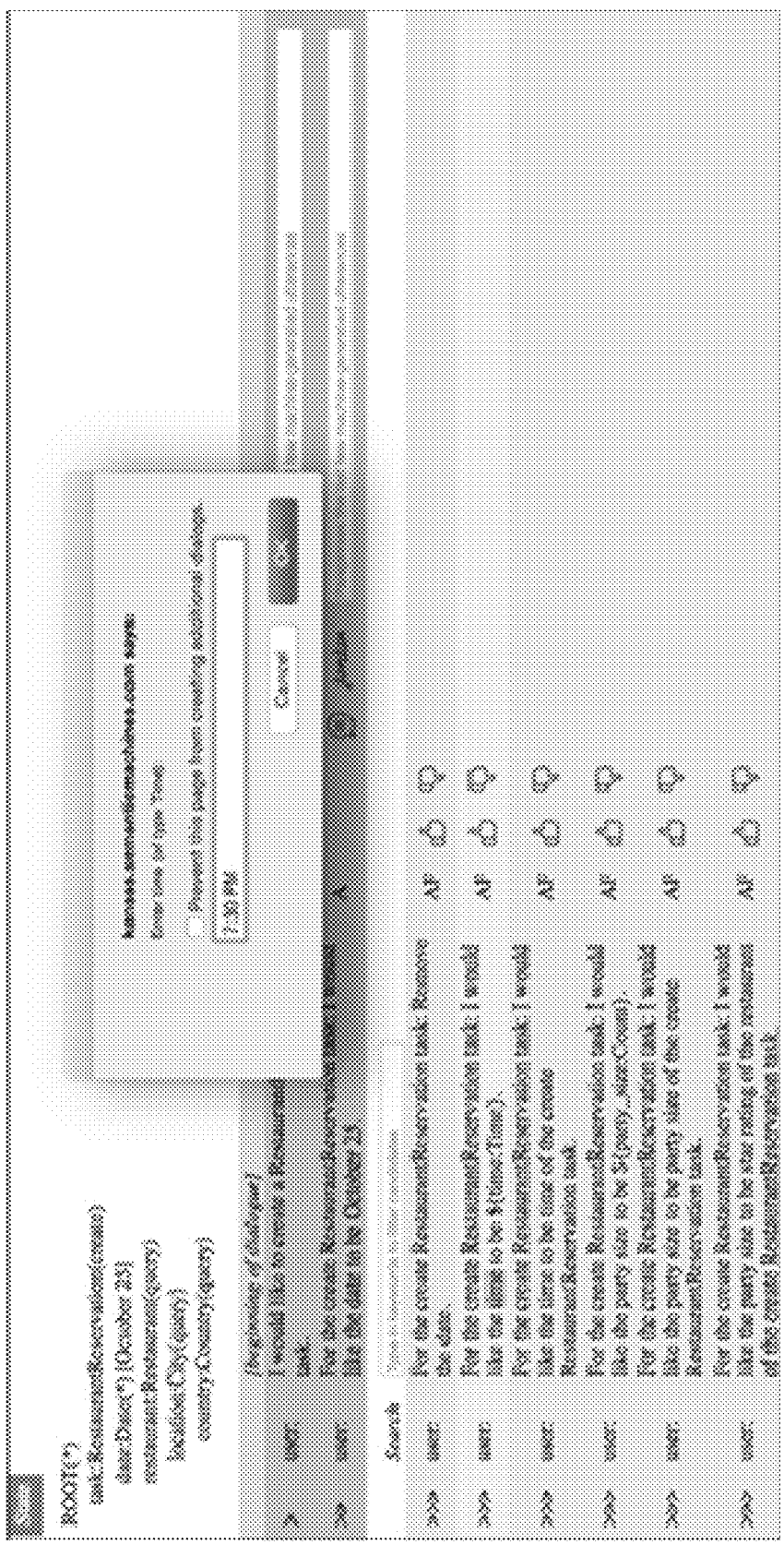
FIG. 9 illustrates another user interface provided by the present system.

FIG. 9 illustrates another display provided by the present system. In particular, FIG. 9 illustrates a screen after the creator has provided input. The input may include a click on the Time system action for the user, and has filled in 7:30 in the pop-up box which is created. Upon clicking OK in the time box, the creator may then cause the system to provide a display as shown in FIG. 10.

Figure 10:
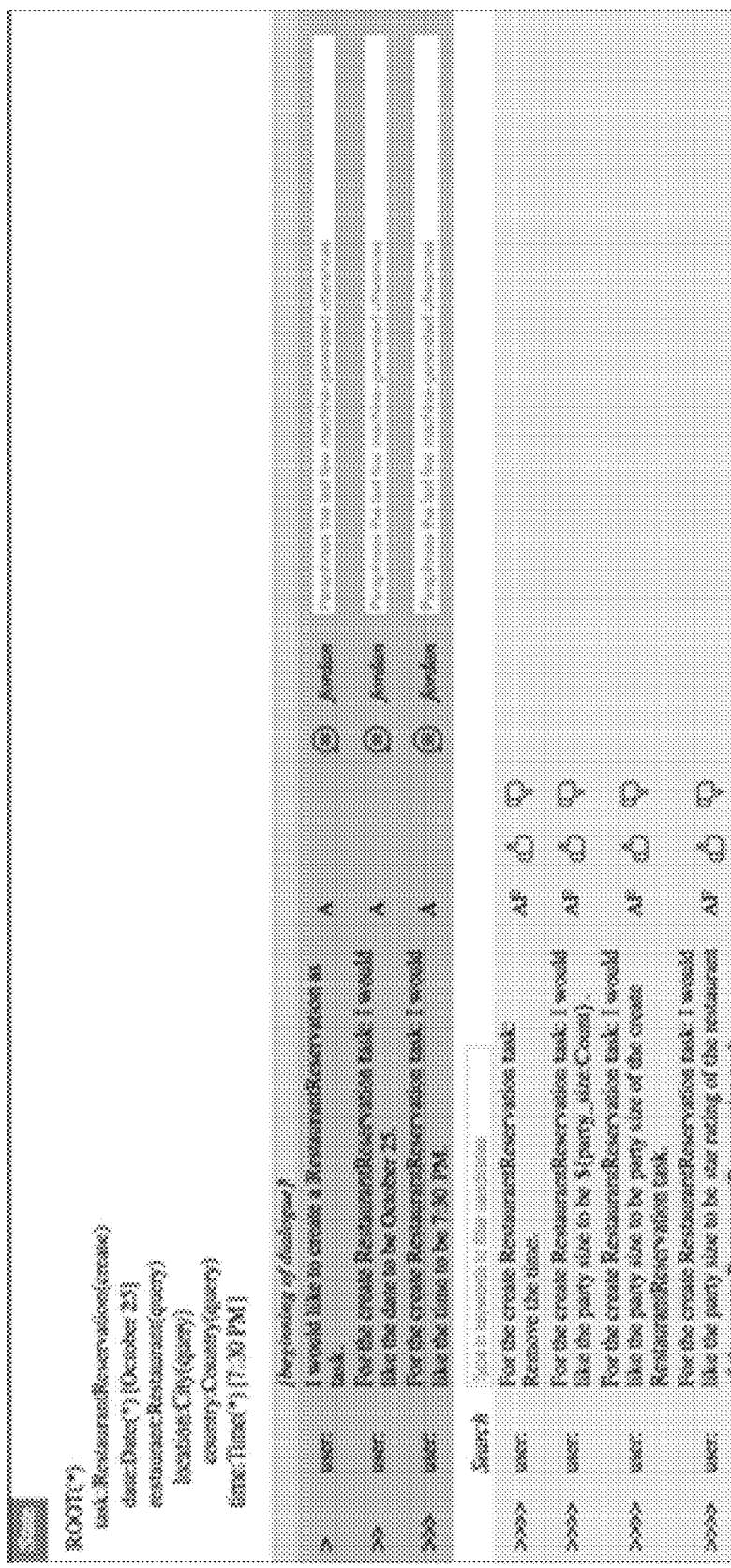
FIG. 10 illustrates another user interface provided by the present system.

FIG. 10 illustrates another display provided by the present system. In particular, FIG. 10 illustrates a display provided by the present system. The display of FIG. 10 may be provided after receiving input clicking on the time. Note that the time has been posted to the history and to the internal state. The creator has now selected three system actions to be done in behalf of the user, but has yet to offer a paraphrase. He may now paraphrase all the user actions, resulting in FIG. 11.

Figure 11:
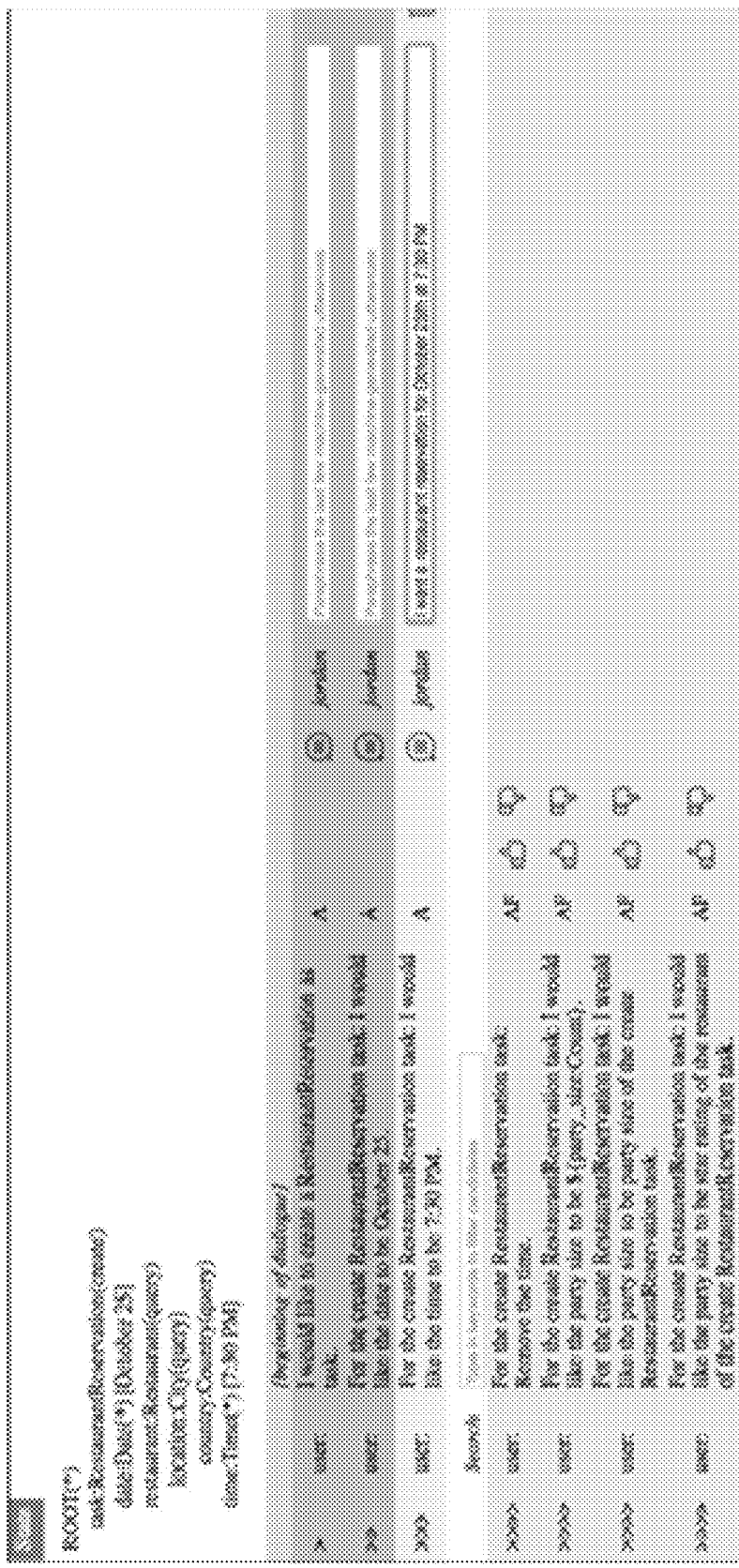
FIG. 11 illustrates another user interface provided by the present system.

FIG. 11 illustrates another display provided by the present system. In particular, FIG. 11 illustrates that the creator has paraphrased all of the user actions in a single sentence on the right of the yellow line. To continue the dialog, the creator should pick an action for the agent (representing the system explicitly in the dialog). The agent could be thought of as a person, but in present system it should be considered a virtual person which knows the constraints of the conversational system. The Creator can find system actions for the agent by using the search box, as in FIG. 12.

Figure 12:
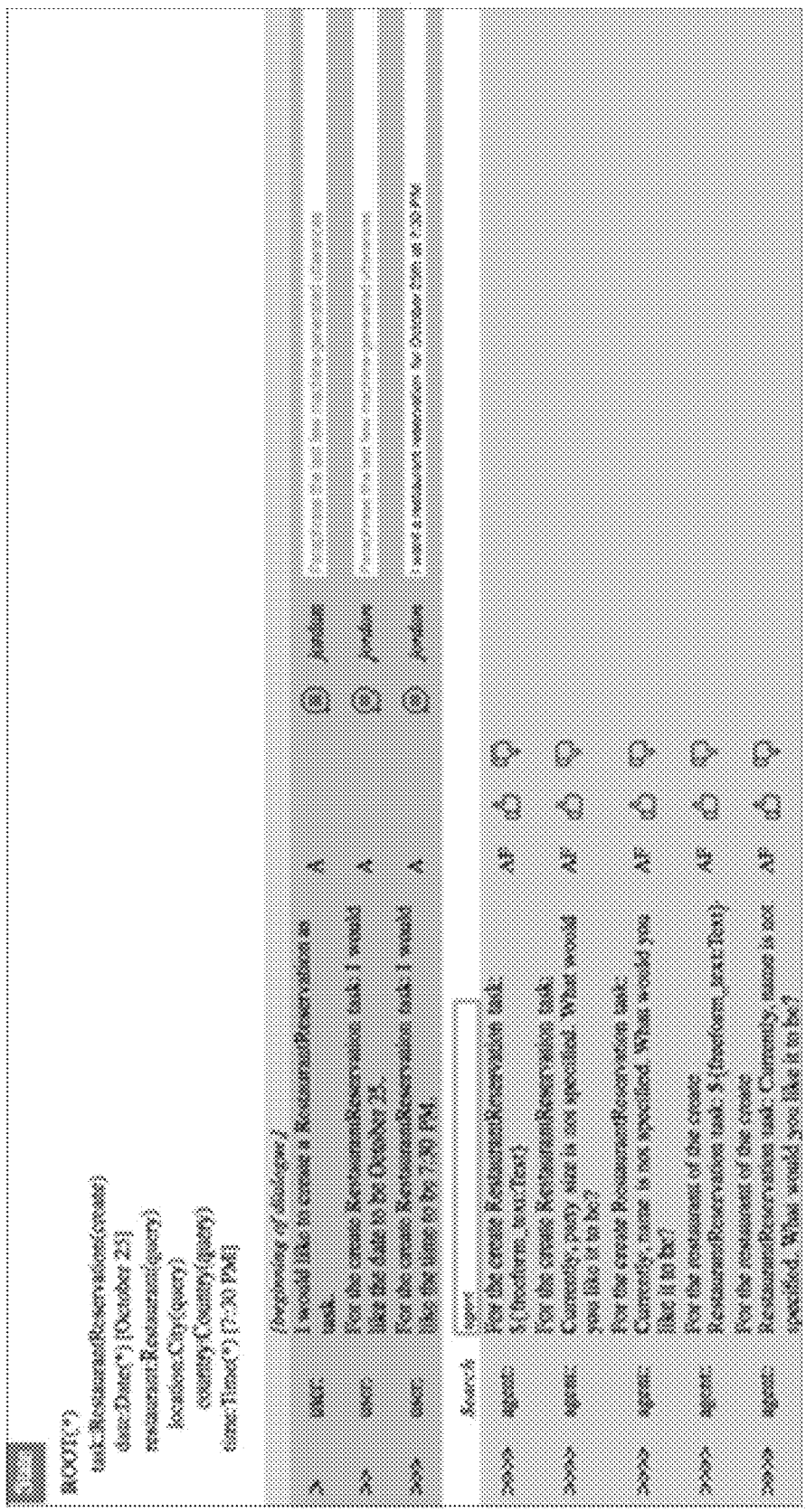
FIG. 12 illustrates another user interface provided by the present system.

FIG. 12 illustrates another display provided by the present system. In particular, FIG. 12 illustrates that the Creator has filled in the word "agent" in the search box, and the top of the list of agent actions are now displayed below the search box. An agent action may be picked using the mouse, creating FIG. 13.

Figure 13:
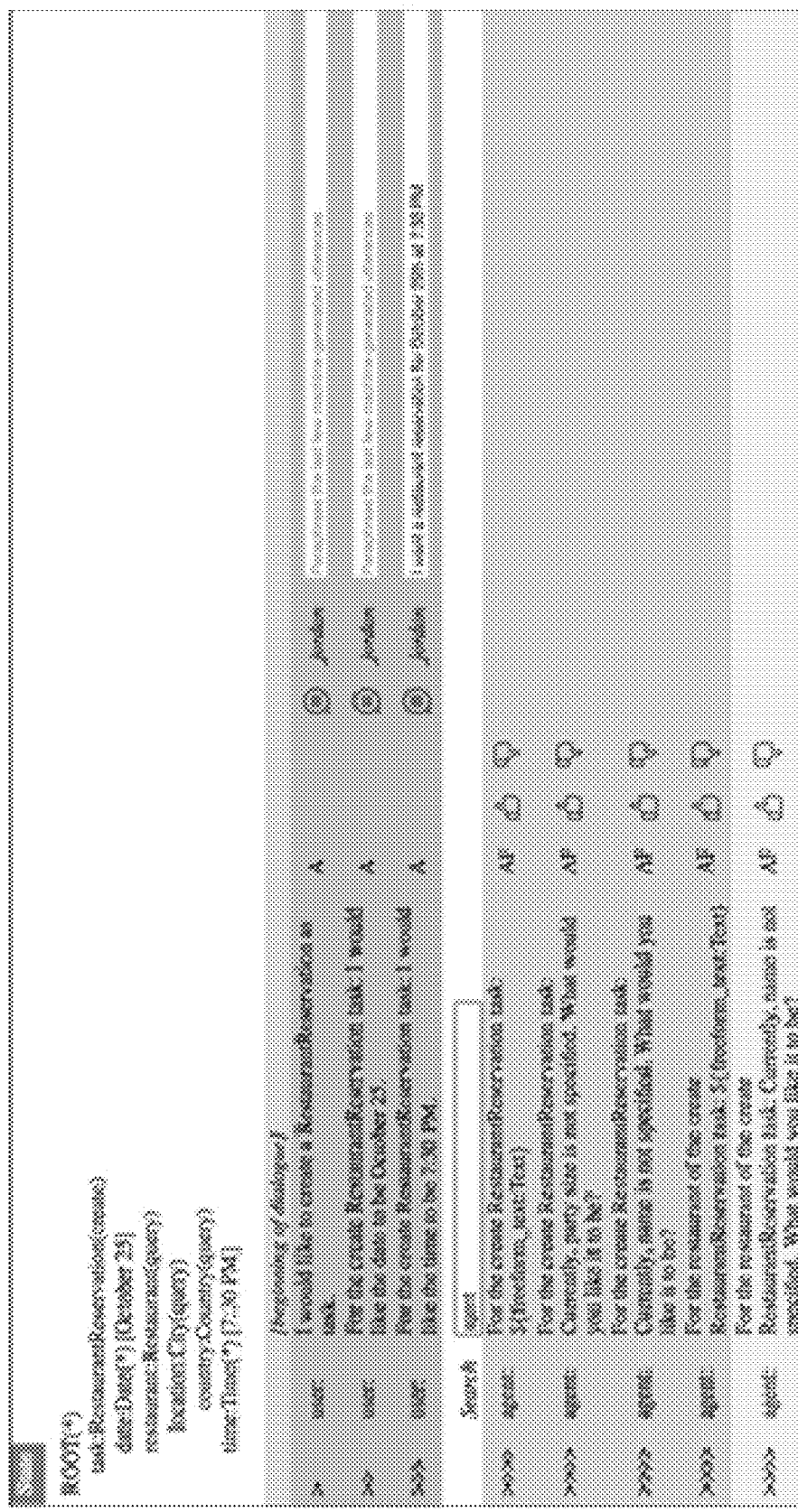
FIG. 13 illustrates another user interface provided by the present system.

FIG. 13 illustrates another display provided by the present system. In particular, FIG. 13 illustrates that the action of the agent is now selected by mouse, and highlighted in yellow. Clicking on the selected agent task of asking for the restaurant name results in FIG. 14.

Figure 14:
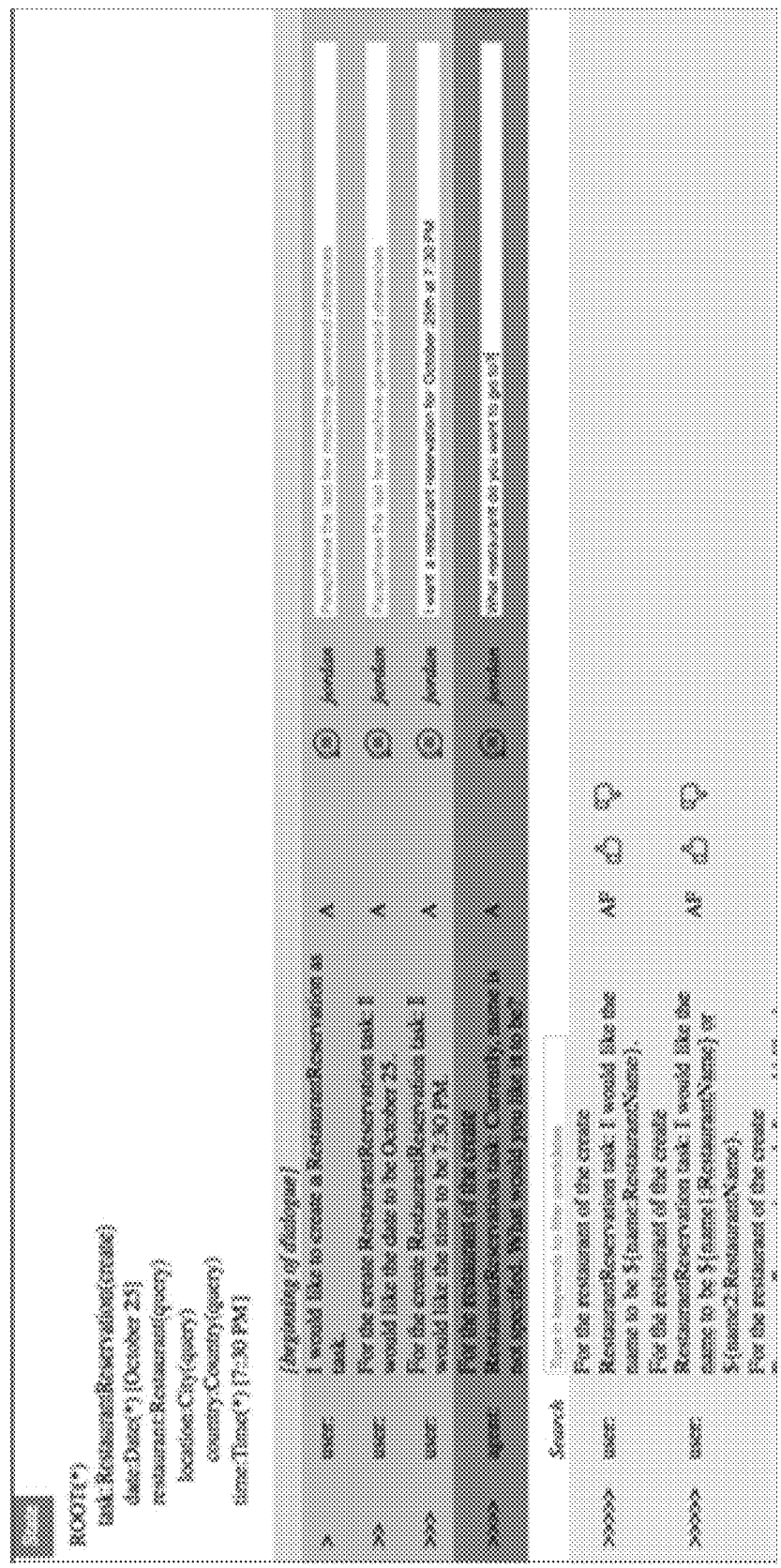
FIG. 14 illustrates another user interface provided by the present system.

FIG. 14 illustrates another display provided by the present system. In particular, FIG. 14 illustrates the user interface after clicking on the agent action to request a restaurant name. Note that the creator has provided a paraphrase for the agent's action, implying that present system will now be requesting a user action. After filling in the paraphrase of the restaurant name request, the present system has offered a context-dependent selection of possible user actions. One may be picked with the mouse, resulting in a highlighted next dialogue action as shown in FIG. 15.

Figure 15:
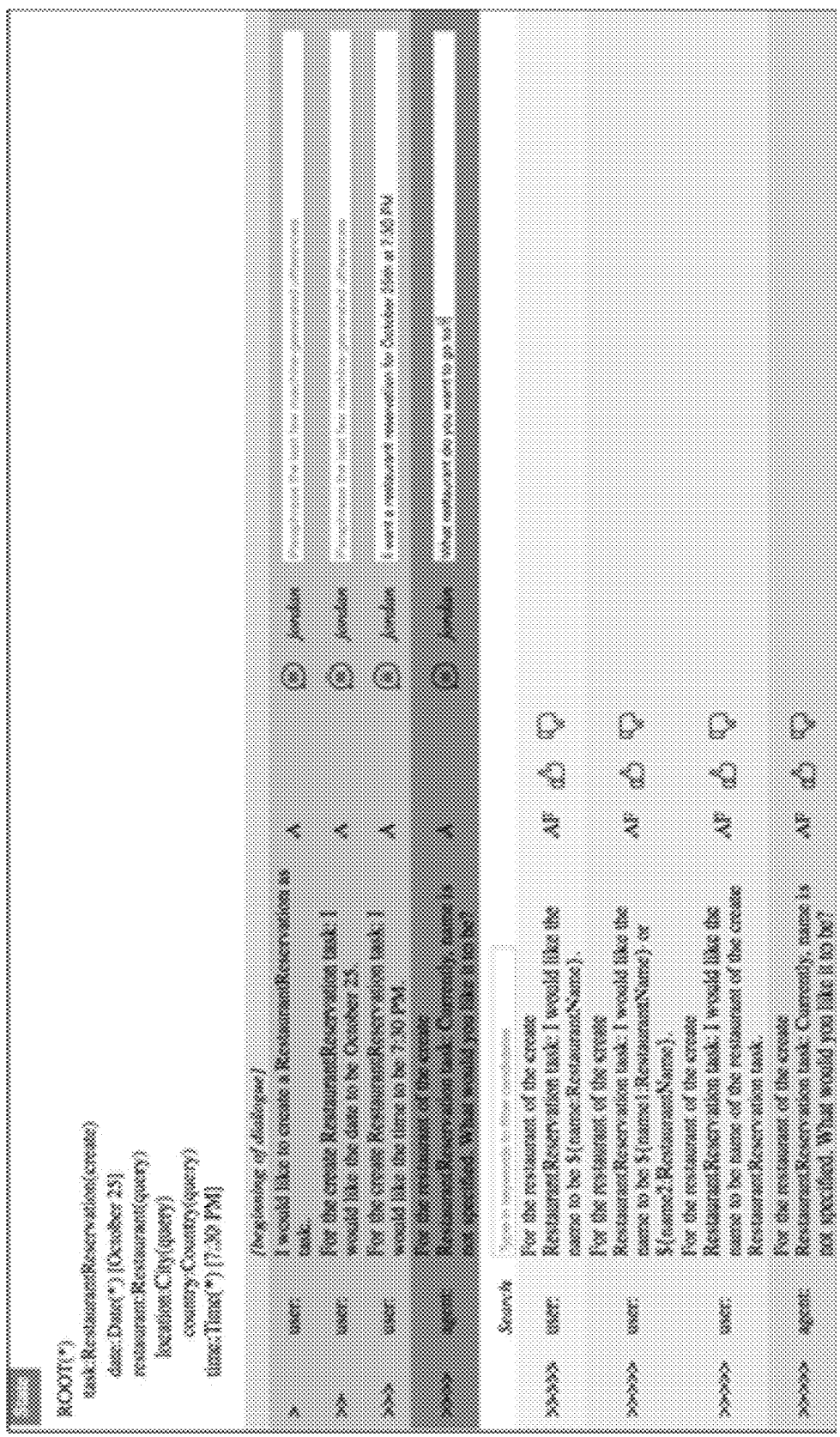
FIG. 15 illustrates another user interface provided by the present system.

FIG. 15 illustrates another display provided by the present system. In particular, FIG. 15 illustrates that the creator is selecting a next action to be taken by the user in the dialogue by directing a cursor, for example using a mouse or other input device, over a possibility which is then highlighted in yellow. The next task for the user is to provide a restaurant name. Clicking on the yellow line in FIG. 15, the present system get FIG. 16.

Figure 16:
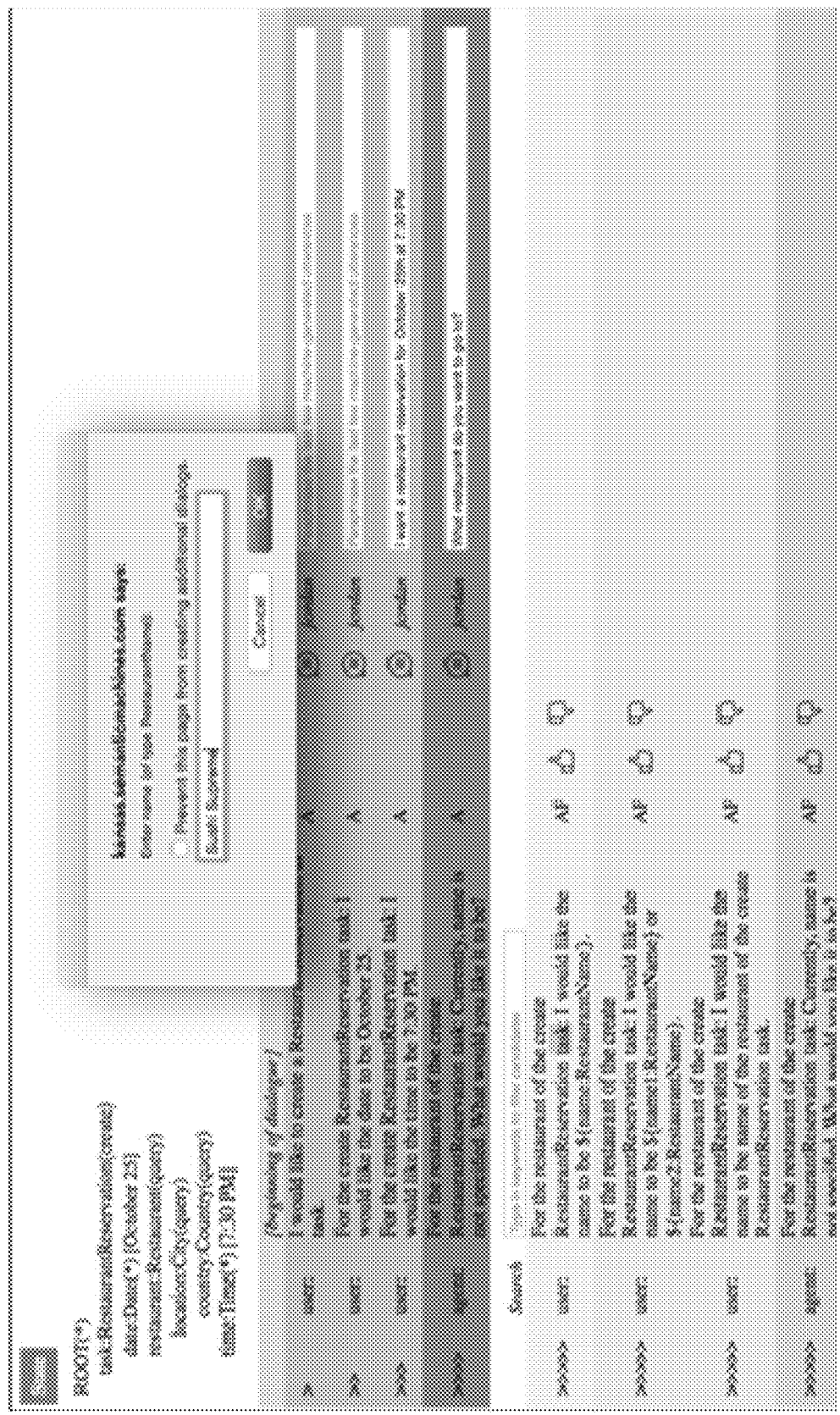
FIG. 16 illustrates another user interface provided by the present system.

FIG. 16 illustrates another display provided by the present system. In particular, FIG. 16 illustrates the result of clicking on the highlighted line in FIG. 15, then filling in the pop-up box asking for a restaurant name. Upon clicking OK in the dialogue box, filling in the paraphrase, and writing "agent" in the search box, the present system get FIG. 17.

Figure 17:
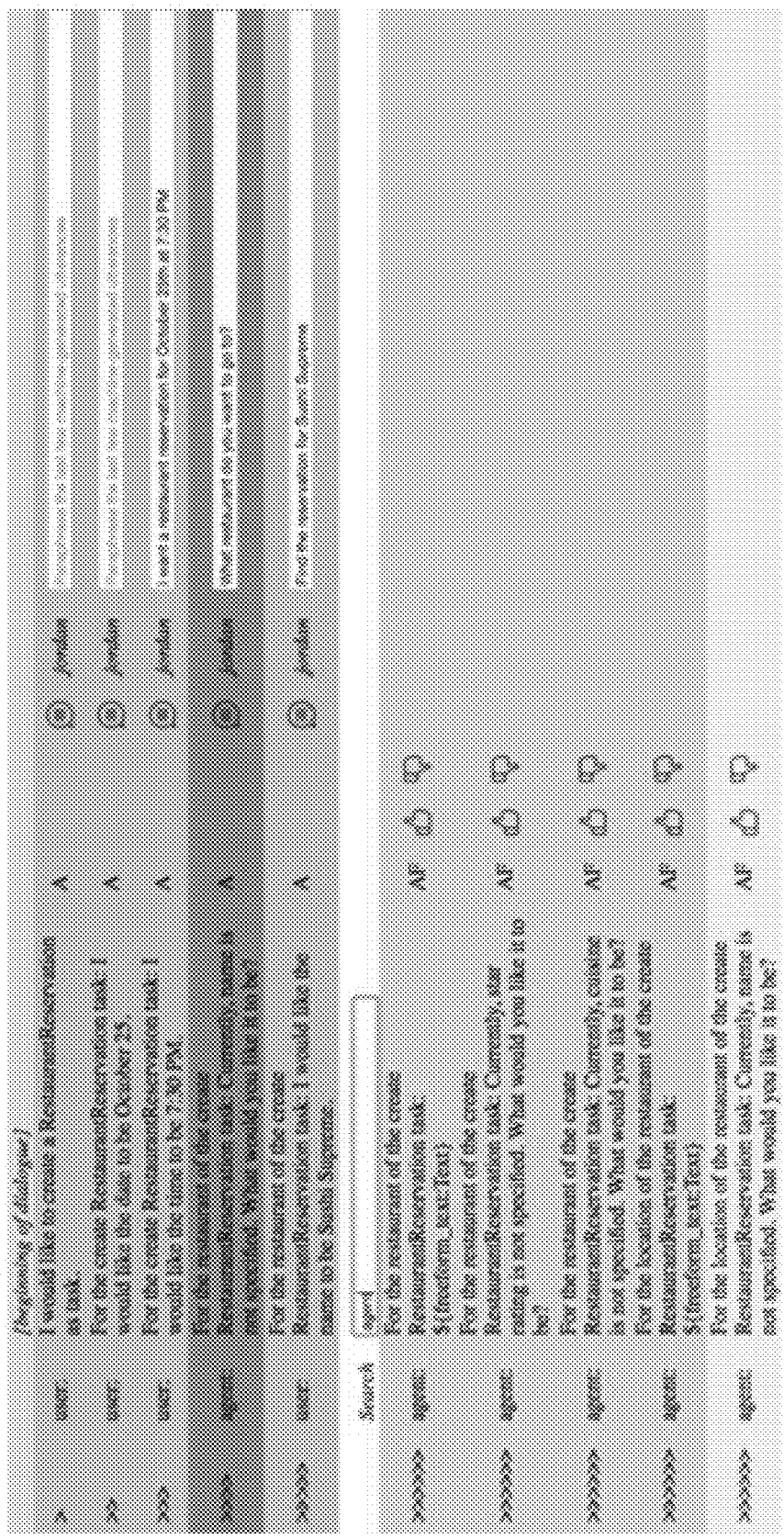
FIG. 17 illustrates another user interface provided by the present system.

FIG. 17 illustrates another display provided by the present system. In particular, FIG. 17 illustrates the system interface after selecting a restaurant name. The creator has asked for possible actions for the agent, and has highlighted a request by the agent for the location of the restaurant.

Figure 18:
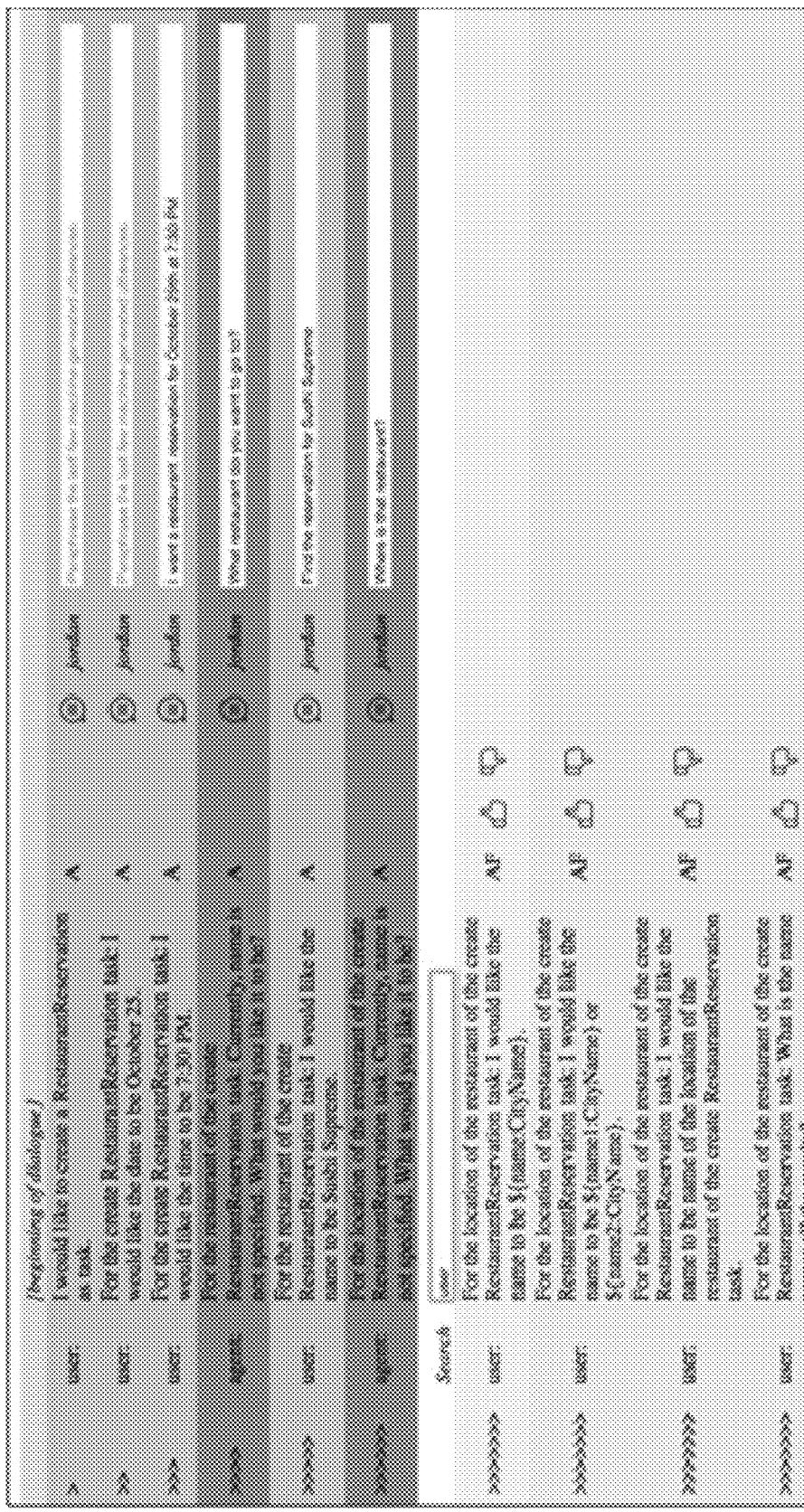
FIG. 18 illustrates another user interface provided by the present system.

FIG. 18 illustrates another display provided by the present system. In particular, in FIG. 18, the agent has requested the location of the restaurant, and the creator has selected the user action of providing the name. As shown, the creator has highlighted the next dialogue step, where the user will provide the location of the restaurant. Clicking on the user action noted in FIG. 18, the present system then provides FIG. 19.

Figure 19:
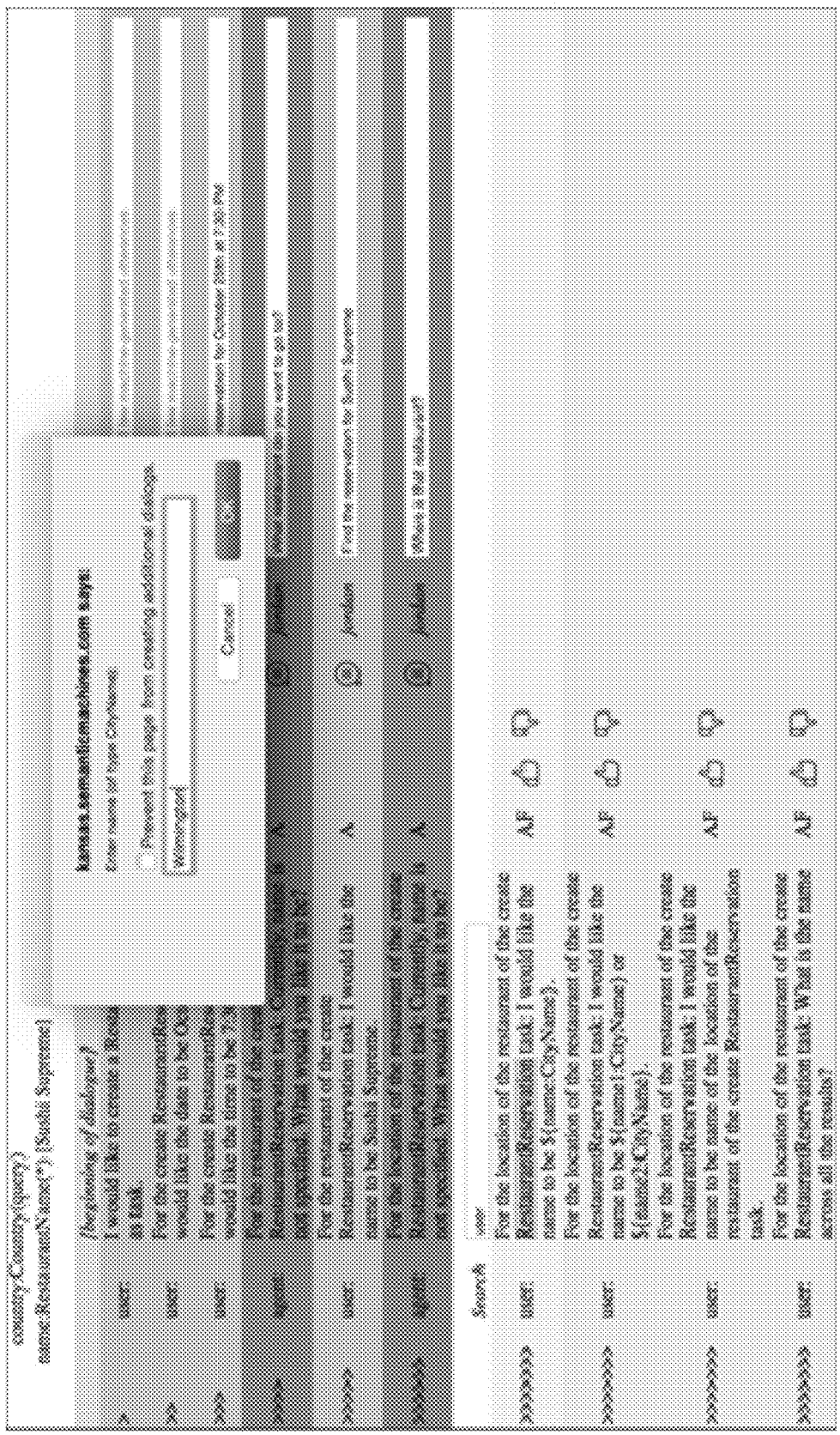
FIG. 19 illustrates another user interface provided by the present system.

FIG. 19 illustrates another display provided by the present system. In particular, FIG. 19 illustrates that the user has specified the restaurant location in the pop up box. After the user has specified the restaurant, the creator would like to find an appropriate action for the agent, but it is somewhat lower in the list than the top screen. The creator thus scrolls down his screen to select an action for the agent, creating FIG. 20.

Figure 20:
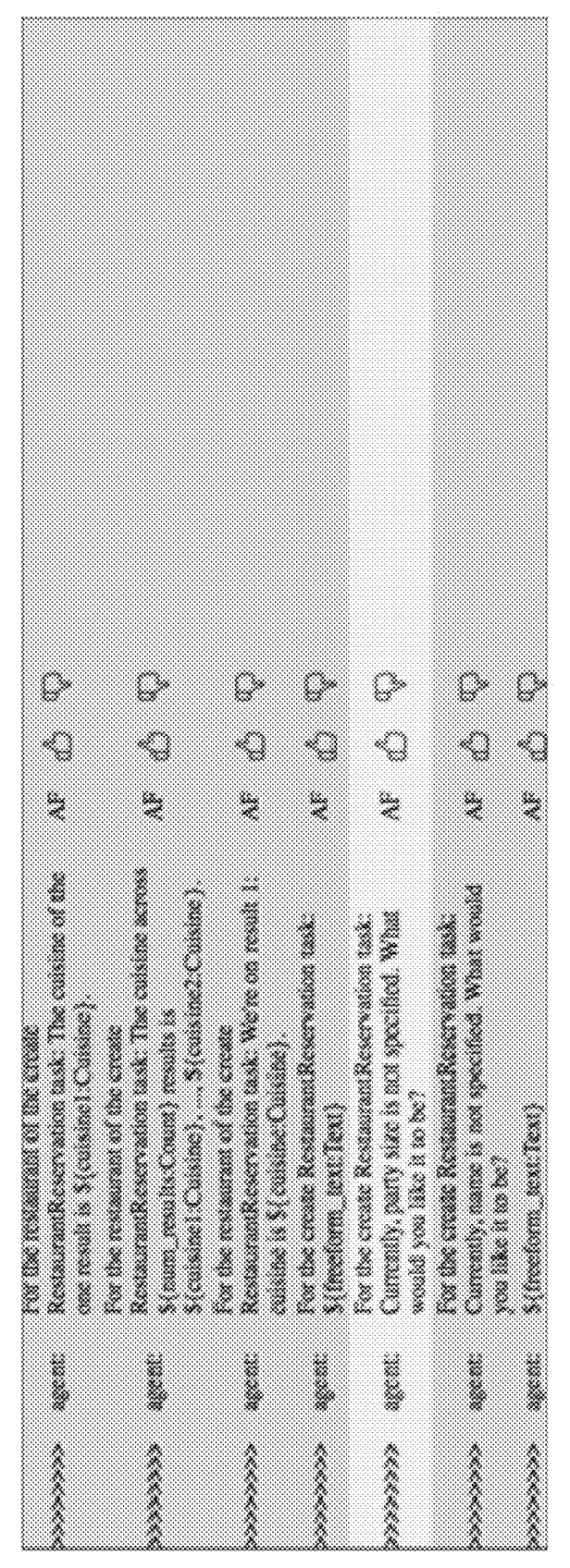

FIG. 20 illustrates another display provided by the present system. In particular, FIG. 20 illustrates the party-size request for the agent in the list of possible actions. Alternatively, the creator could put a request for party size in the search box, and the party-size action would be at the top of the action list, as in FIG. 21.

Figure 21:
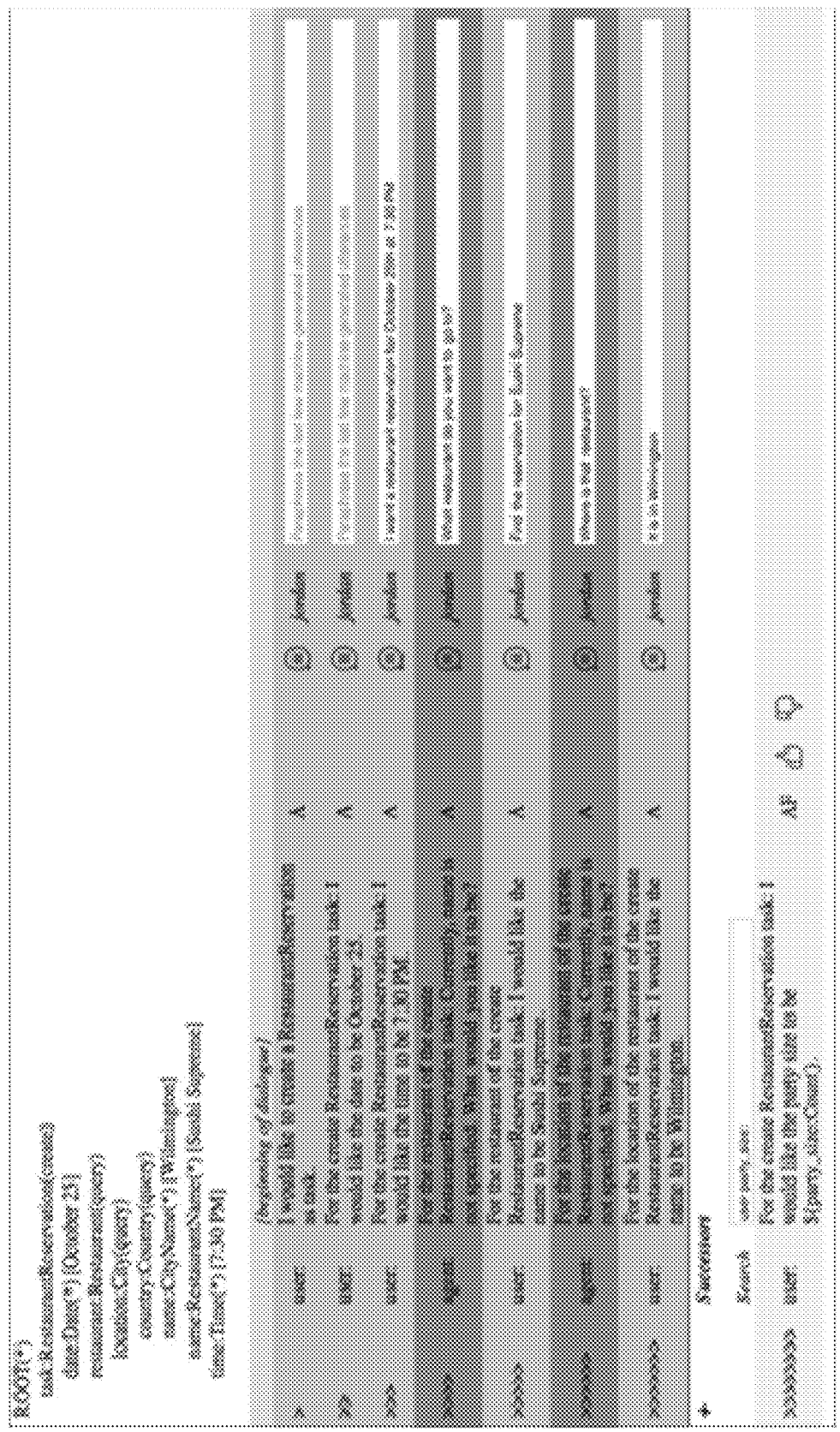
FIG. 21 illustrates another user interface provided by the present system.

FIG. 21 illustrates another display provided by the present system. In particular, FIG. 21 illustrates selecting a party size request from a list which has been reordered by the search box. Clicking on the party size action results in FIG. 22.

Figure 22:
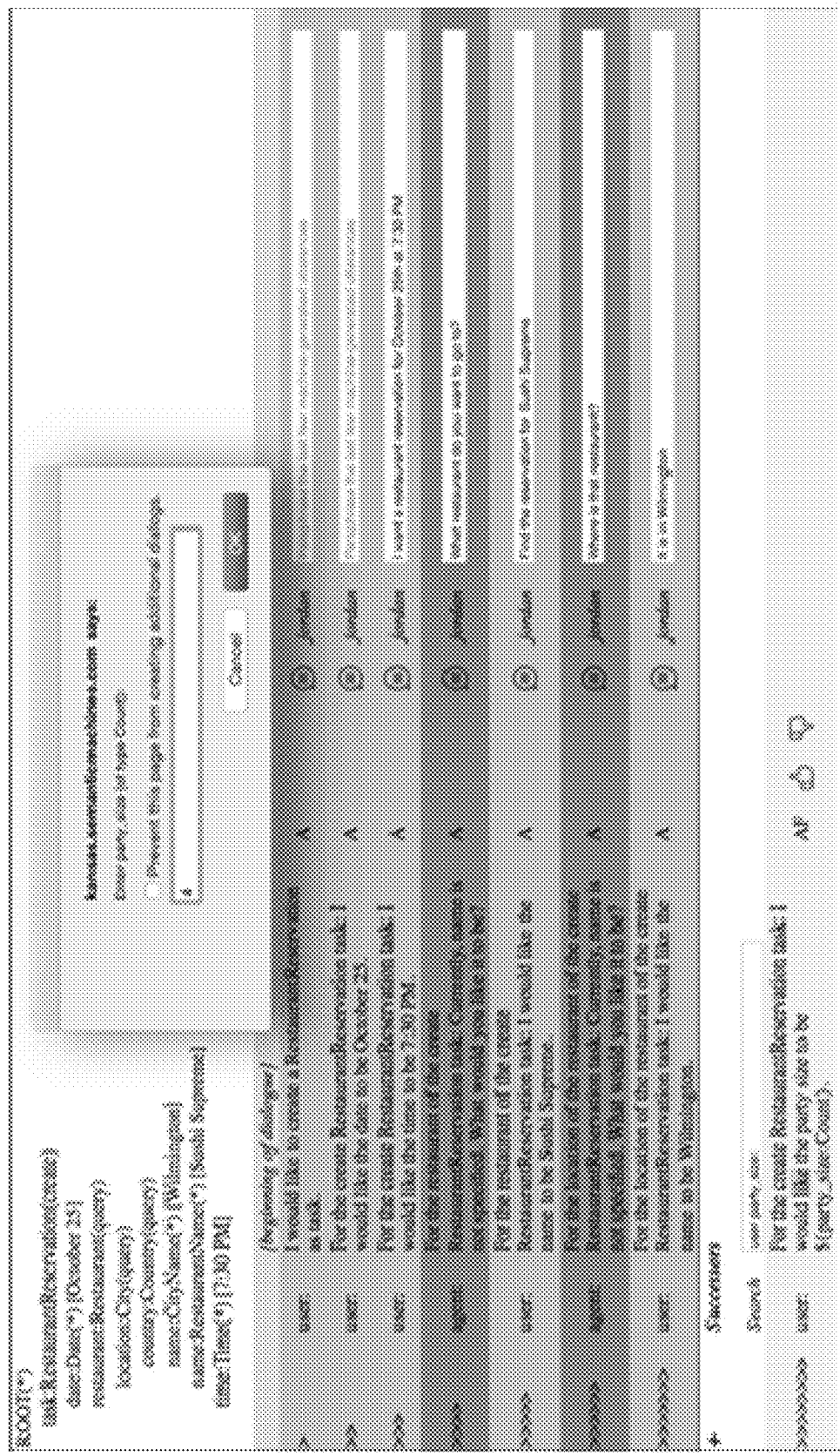
FIG. 22 illustrates another user interface provided by the present system.

FIG. 22 illustrates another display provided by the present system. In particular, FIG. 22 illustrates that the creator has filled in a party size of 4 into the pop up box from clicking on the user activity of defining the party size. Clicking on OK, and then clicking on a completion action by the agent, the present system transitions to FIG. 23. Note that whenever the present system changes the imaginary actor from user to agent or vice versa, the creator fills in the paraphrase box for that action or series of actions.

Figure 23:
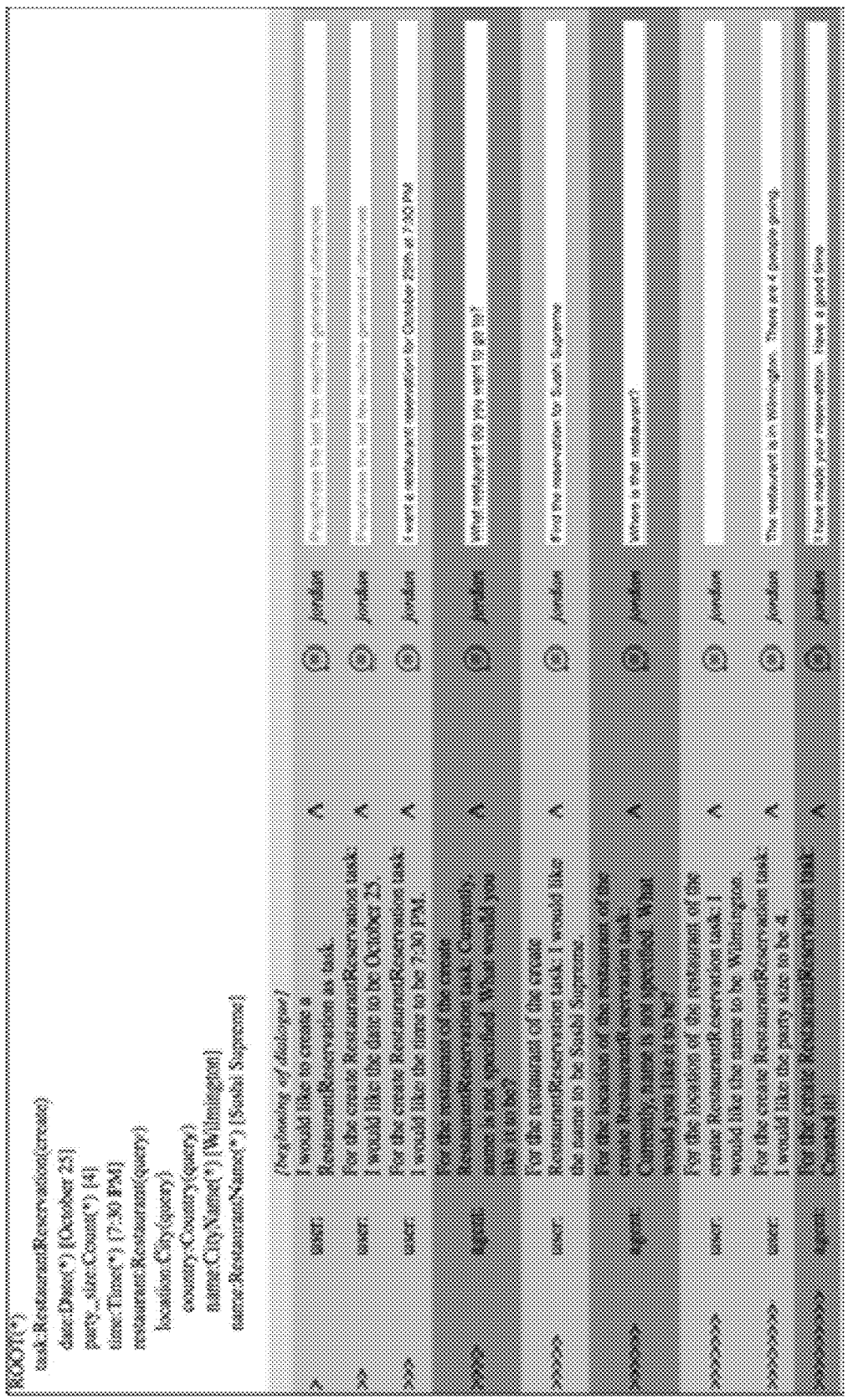
FIG. 23 illustrates another user interface provided by the present system.

FIG. 23 illustrates another display provided by the present system. In particular, FIG. 23 illustrates the final FIGURE for the dialogue between the user and the agent which is created by the creator. Note that the "system" knows some information from the conversation, which is located in the upper left of FIG. 23. More important, the present system user interface has now created a complete dialogue in which each paraphrased phrase is associated with one or more activities of the conversational system. It is exactly this association which creates data on which to train a conversational system.

The annotated conversation may be created in a few minutes by an unskilled creator. As noted above, if the creator has to use free text phrases rather than specific present system actions, then it is a flag that the system might be lacking some essential ingredients.

The system described herein may be implemented in several ways and include additional and fewer features while still within the intended scope of the present technology.

For example, the possible actions may be sorted in order of decreasing policy model score. This is like an autocomplete, suggesting actions which the model thinks are more likely. The creator can always reject the top options and scroll down to the desired choice. This adds additional training data, which trains the policy in an online fashion. Additionally, the possible actions can also be sorted by order of increasing absolute value of the model score. This favors scores which are close to 0, for which the policy is most uncertain about. This allows the creator to provide information to explore unexpected activities or new actions, analogous to an active learning system.

Further, the possible actions may be restricted to model a particular implementation of a conversational system to reduce the search space. Also, the conversation which is paraphrased in this example may be provided to the creator, thus making the task to choose system actions which match the conversation. This can be used to verify the system. In some instances, the series of system actions may be provided to the creator, thus making the task to write paraphrases which match the system actions rather than choosing actions. In some instances, the creator may be asked to evaluate some or all of the potential conversation extension activities as appropriate or inappropriate, or to grade them on some appropriate criteria. In some instances, the creator can be asked to either rate the actions exhaustively or to simply choose the 5-10 most likely actions. In some instances, the creator can be asked to mark only the actions which are possible or the actions which are probable.

Figure 24:
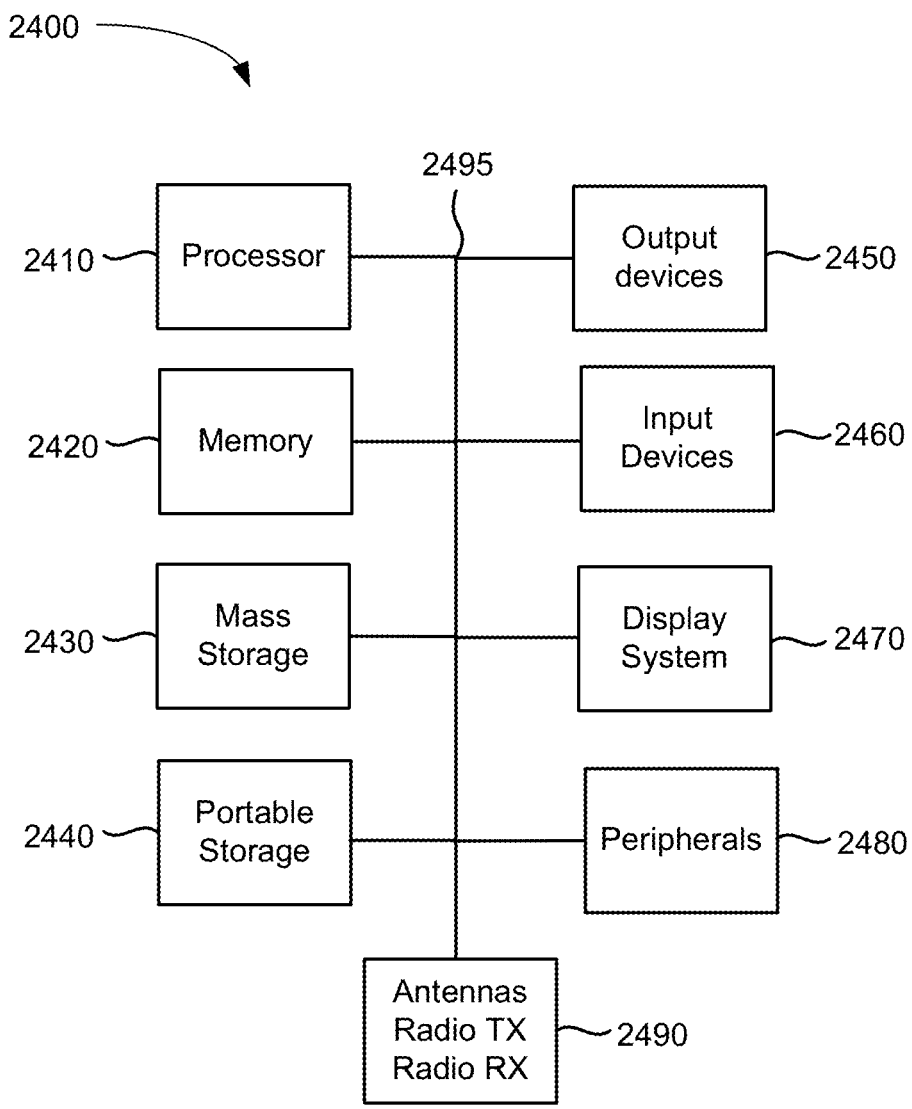
FIG. 24 is a block diagram of an exemplary device for implementing the present technology.

FIG. 24 is a block diagram of a computer system 2400 for implementing the present technology. System 2400 of FIG. 24 may be implemented in the contexts of the likes of client 110, mobile device 120, computing device 130, network server 150, application server 160, data store 170, annotated training datastore 180, and data generation system 190.

The computing system 2400 of FIG. 24 includes one or more processors 2410 and memory 2420. Main memory 2420 stores, in part, instructions and data for execution by processor 2410. Main memory 2410 can store the executable code when in operation. The system 2400 of FIG. 24 further includes a mass storage device 2430, portable storage medium drive(s) 2440, output devices 2450, user input devices 2460, a graphics display 2470, and peripheral devices 2480.

The components shown in FIG. 24 are depicted as being connected via a single bus 2495. However, the components may be connected through one or more data transport means. For example, processor unit 2410 and main memory 2420 may be connected via a local microprocessor bus, and the mass storage device 2430, peripheral device(s) 2480, portable or remote storage device 2440, and display system 2470 may be connected via one or more input/output (I/O) buses.

Mass storage device 2430, which may be implemented with a magnetic disk drive or an optical disk drive, is a non-volatile storage device for storing data and instructions for use by processor unit 2410. Mass storage device 2430 can store the system software for implementing embodiments of the present invention for purposes of loading that software into main memory 2420.

Portable storage device 2440 operates in conjunction with a portable non-volatile storage medium, such as a compact disk, digital video disk, magnetic disk, flash storage, etc. to input and output data and code to and from the computer system 2400 of FIG. 24. The system software for implementing embodiments of the present invention may be stored on such a portable medium and input to the computer system 2400 via the portable storage device 2440.

Input devices 2460 provide a portion of a user interface. Input devices 2460 may include an alpha-numeric keypad, such as a keyboard, for inputting alpha-numeric and other information, or a pointing device, such as a mouse, a trackball, stylus, or cursor direction keys. Additionally, the system 2400 as shown in FIG. 24 includes output devices 2450. Examples of suitable output devices include speakers, printers, network interfaces, and monitors.

Display system 2470 may include a liquid crystal display (LCD), LED display, touch display, or other suitable display device. Display system 2470 receives textual and graphical information, and processes the information for output to the display device. Display system may receive input through a touch display and transmit the received input for storage or further processing.

Peripherals 2480 may include any type of computer support device to add additional functionality to the computer system. For example, peripheral device(s) 2480 may include a modem or a router.

The components contained in the computer system 2400 of FIG. 24 can include a personal computer, hand held computing device, tablet computer, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS or iOS, Android, and other suitable operating systems, including mobile versions.

When implementing a mobile device such as smart phone or tablet computer, or any other computing device that communicates wirelessly, the computer system 2400 of FIG. 24 may include one or more antennas (e.g., antenna 2490), radios, and other circuitry for communicating via wireless signals, such as for example communication using Wi-Fi, cellular, or other wireless signals.

What is claimed is:

1. A method for training an annotated dialogue system, comprising:
   generating, by a data generation application executing on a machine, a first list of canonical utterances in a dialogue tree of possible dialogues, the first list of canonical utterances generated in response to an input received from an annotating user;
   receiving from the annotating user a first selection of a first canonical utterance from the first list, the selection indicating a first step in a multi-step dialogue;
   generating a second list of canonical utterances, the second list of canonical utterances generated in response to the first selection from the first list;
   receiving from the user a second selection of a second canonical utterance from the second list, the second selection indicating a second step in the multi-step dialogue that also includes the first step;
   presenting a user interface indicating a dialogue path including both the first step and the second step;
   receiving from the annotating user via the user interface a compound paraphrase for the dialogue path including both the first step and the second step; and
   training the annotated dialogue system on annotated data including the compound paraphrase, the first step, and the second step.

2. The method of claim 1, wherein the compound paraphrase represents paraphrasing for the whole dialogue path, wherein the first selection from the first list and the second selection from the second list are two canonical utterances of a plurality of three or more selected canonical utterances in the dialogue path.

3. The method of claim 1, further comprising receiving, through the user interface, a ranking from the annotating user for one or more canonical utterances of the first list and the second list.

4. The method of claim 1, wherein further comprising storing the annotated training data in a format suitable for training the annotated dialogue system.

5. The method of claim 1, wherein generating a first list of a plurality of canonical utterances includes:
   querying a database of possible actions,
   generating a logical form at least in part from each action; and
   generating a canonical utterance from each logical form.

6. The method of claim 5, wherein a logical form generated from an action includes computer code associated with the action, and wherein a canonical utterance generated from the logical form is a pseudocode representation of the computer code associated with the action.

7. The method of claim 1, wherein the first list and second list are each ranked according to a ranking model.

8. The method of claim 7, wherein the ranking model is based at least in part from user rankings of previous canonical utterances.

9. The method of claim 1, wherein the first list and the second list are provided via the user interface.

10. The method of claim 9, wherein the user interface includes state information for the current dialogue.

11. The method of claim 9, wherein the user interface includes a search box.

12. The method of claim 9, further comprising, in response to receiving the first input from the list, removing the one or more canonical utterances of the list that were not selected by the annotating user from the user interface.

13. The method of claim 9, further comprising, in response to receive the first input, adding the selected canonical utterance to a list of selected canonical utterances.

14. A system for training an annotated dialogue system, comprising:
- a processor;
- memory;
- one or more modules stored in memory and executable by the processor to:
    - generate, by a data generation application, a first list of canonical utterances in a dialogue tree of possible dialogues, the first list of canonical utterances generated in response to an input received from an annotating user,
    - receive from the annotating user a first selection of a first canonical utterance from the first list, the first selection indicating a first step in a multi-step dialogue,
    - generate a second list of canonical utterances, the second list of canonical utterances generated in response to the first selection from the first list,
    - receive from the annotating user a second selection of a second canonical utterance from the second list, the second selection indicating a second step in the multi-step dialogue that also includes the first step,
    - present a user interface indicating a dialogue path including both the first step and the second step,
    - receive from the annotating user via the user interface a compound paraphrase for the dialogue path including both the first step and the second step, and
    - train the annotated dialogue system on annotated data including the compound paraphrase, the first step, and the second step.

15. The system of claim 14, wherein the one or more modules stored in memory are further executable by the processor to receive, through the user interface, a ranking from the annotating user for one or more canonical utterances of the first list and the second list.

16. The system of claim 14, further comprising storing the annotated data in a format suitable for training a dialogue system.

17. The system of claim 14, wherein the first list and second list are each ranked according to a ranking model.

18. The system of claim 17, wherein the ranking model is based at least in part on user rankings of previous canonical utterances.

19. The system of claim 18, wherein the first list and second list are provided within the interface.

20. A computer system including a processor and memory holding instructions executable by the processor to perform a method for training an annotated dialogue system, the method comprising:
- generating a first list of canonical utterances in a dialogue tree of possible dialogues, the first list of canonical utterances generated in response to an input received from an annotating user;
- receiving from the annotating user a first selection of a first canonical utterance from the first list, the first selection indicating a first step in a multi-step dialogue;
- generating a second list of canonical utterances, the second list of canonical utterances generated in response to the first selection from the first list;
- receiving from the annotating user a second selection of a second canonical utterance from the second list, the second selection indicating a second step in the multi-step dialogue that also includes the first step;
- presenting a user interface indicating a dialogue path including both the first step and the second step and an input box configured for receiving a compound paraphrase for the dialogue path including both the first step and the second step;
- receiving from the annotating user via the input box of the user interface a compound paraphrase for the dialogue path including both the first step and the second step; and
- training the annotated dialogue system on annotated data including the compound paraphrase, the first step, and the second step.

* * * * *